United States Patent [19]

Rusk

[11] 4,106,472
[45] Aug. 15, 1978

[54] ROTARY ENERGY CONVERTER WITH RESPIRING CHAMBERS

[76] Inventor: Glenn Rusk, 396 Bleecker St., New York, N.Y. 10014

[21] Appl. No.: 740,028

[22] Filed: Nov. 8, 1976

[51] Int. Cl.$^2$ .................. F02B 55/14; F02B 53/10; F02B 53/02; F01C 19/00
[52] U.S. Cl. .................. 123/205; 123/216; 123/243; 418/99; 418/111; 418/142; 418/143; 418/266
[58] Field of Search ............. 123/8.05, 8.09, 8.11, 123/8.13, 8.45; 418/99, 111, 142, 143, 266, 267, 268

[56] References Cited

U.S. PATENT DOCUMENTS

| | | | |
|---|---|---|---|
| 775,212 | 11/1904 | Early | 418/142 |
| 1,294,834 | 2/1919 | Rothweiler | 418/266 |
| 1,369,070 | 2/1921 | Williams et al. | 418/99 |
| 1,601,397 | 9/1926 | Kochendarfer | 418/266 |
| 2,468,451 | 4/1949 | Kutzner | 123/8.13 |
| 2,478,924 | 8/1949 | Johnson | 123/8.45 |
| 2,831,631 | 4/1958 | Petersen | 418/111 |
| 3,227,145 | 1/1966 | Bernard | 123/8.09 |
| 3,249,096 | 5/1966 | Franceschini | 123/8.45 |
| 3,908,608 | 9/1975 | Fox | 123/8.45 |
| 3,971,347 | 7/1976 | Vasilantone | 123/8.45 |

FOREIGN PATENT DOCUMENTS

| | | | |
|---|---|---|---|
| 629,349 | 3/1963 | Belgium | 123/8.45 |
| 1,451,734 | 8/1969 | Fed. Rep. of Germany | 123/8.45 |

*Primary Examiner*—John J. Vrablik
*Attorney, Agent, or Firm*—Edward F. Levy

[57] ABSTRACT

A rotary energy converter has a rotor provided with a plurality of hinged vanes and centrally mounted within a stator having a generally circular inner wall surface formed with one or more vaulted bays and corresponding abutments. As the rotor rotates within the stator, the hinged vanes are urged outwardly by centrifugal force into wiping contact with the stator inner wall, and are alternately extended and retracted, as the vanes encounter the vaulted bays and abutments to provide a respiring chamber between each pair of adjacent vanes. In one preferred form, the energy converter is shown as a rotary internal combustion engine having at least two vaulted bays, one of which constitutes a fuel inlet and compression bay, and the other of which constitutes a combustion expansion bay with an ignition station located between said bays. Rotor end corner seals are provided between the rotor and the stator end plates and oil-lubricated sliding seals are formed by the stator inner wall surface and the engaging vane surfaces, thereby eliminating the necessity for use of conventional stationary seals. A fuel injection system is actuated and controlled by the respiration of each chamber to provide comparatively low temperatures of combustion.

30 Claims, 22 Drawing Figures

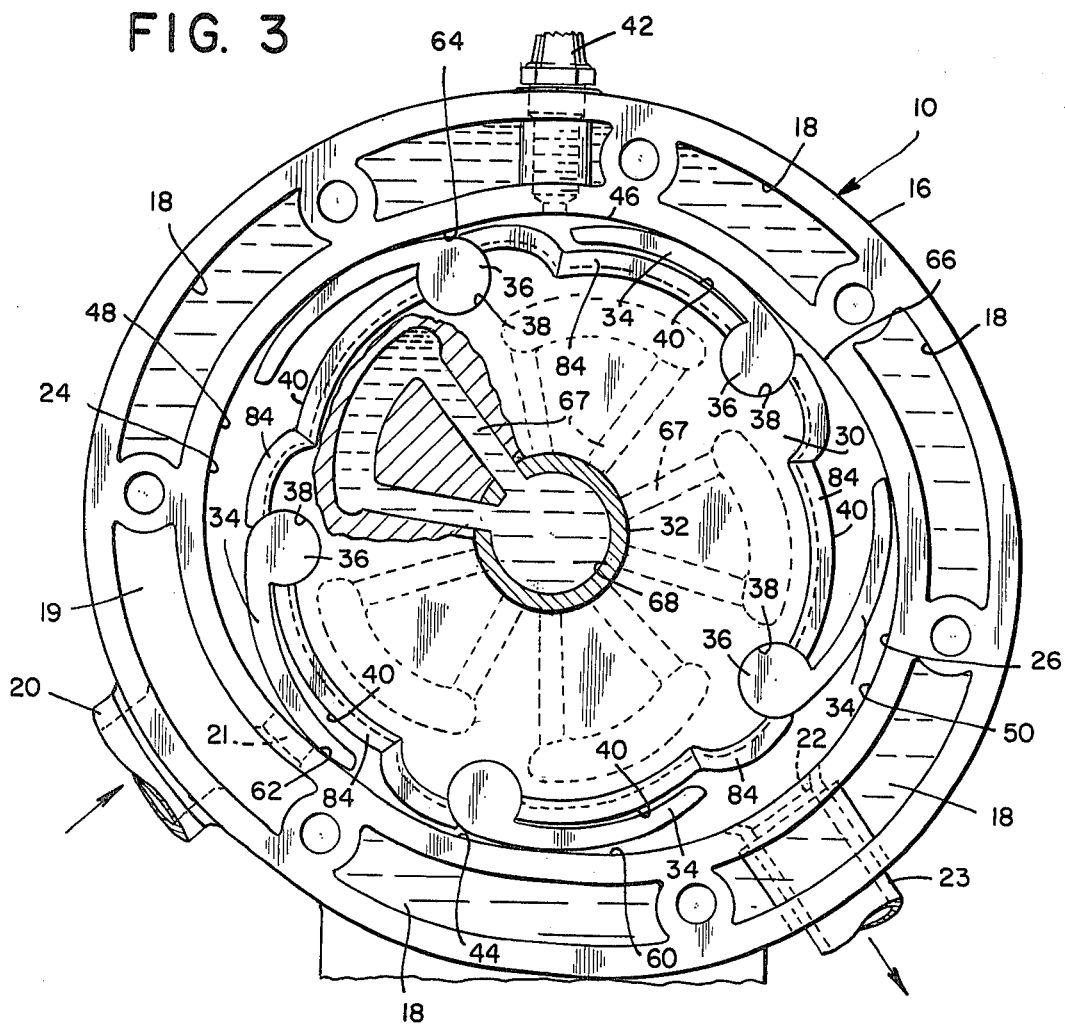

ROTARY ENERGY CONVERTER WITH RESPIRING CHAMBERS

The present invention relates to improvements in rotary prime movers, and in particular to internal combustion rotary engines for automotive service and for large industrial installations. This invention also contemplates improvements in rotary pumps and compressors.

A rotary type engine may possess features which are highly advantageous over those of the reciprocating type engine. One such advantage is that intake and exhaust valving is eliminated and space for ports and ignition is more freely available. In one conventional rotary internal combustion engine, namely the Wankel engine, the three outside faces of the rotor provide extensive operative surfaces which are constantly deployed in useful processes, in contrast to the reciprocating internal combustion engine, in the usual four-stroke cycle, which utilizes only one face of a piston and which revolves two times rather than once to recover an attitude. There are also advantages in more convenient internal cooling of the rotor, higher compression ratios permissible without engine knocking owing to combustion arrangement, remarkable compactness for power output, few moving parts, and operation with decreased noise and vibration.

Despite the many potential advantages of the rotary engine, the reciprocating engine continues to dominate the automotive market perhaps chiefly because it readily provides high pressure sealing by the simple and sturdy shape of sprung rings obstructing blow-by between a piston and a cylinder, whereas the Wankel rotary engine must accept blow-by caused by troublesome sealing geometry. Most refractory of the Wankel engine seals is that at the rotor apex, which must hold a sealing interface with the stator's epitrochoidal pitches. The working face of this apex seal is a curve of small radius as its approach to the work varies over a wide angle from thrust to drag two times for each revolution of the rotor, so that the bearing approaches severe linear contact which limits the advantageous dynamic balance available to rotary engines by the high specific bearing pressure of the apex seal on the stator wall, aggravated by steep radial acceleration inward, forced by the stator pitch two times in each rotation of the apex. Perhaps consequently, the Wankel engine, in its application to automotive vehicles, has been limited to about 2400 rpm for the rotor and 7,000 rpm for the geared shaft, and has not approached the high speeds expected of a rotary engine. Further, like the reciprocating engine, the Wankel rotary engine has its cycle so locked into a geometric pattern of compression and expansion that no change of proportion may be applied to relieve the one-to-one ratio between compression volume and expansion volume, which ratio may result in discharge of exhaust gases before their energy is substantially spent.

Preferably any engine should have a straight-through output shaft without eccentricities for a gear train from each rotor, as is required in the Wankel design, and avoiding crank diversions as for piston connections. A straight shaft not only avoids the losses of efficiency inherent in crank diversions, but it also permits convenient water cooling of the rotor interior.

It is an object of the present invention to provide an energy convertor such as a rotary engine, pump, compressor, fluid driven turbine or the like, in which a plurality of hinged vanes carried by a centrally-mounted rotor engage the confronting inner surface of a stator, which surface is formed with succeeding vaults and abutments so that adjacent pairs of travelling hinged vanes present therebetween a procession of respiring chambers which are operative during rotation of the rotor to ingest, compress, exhaust, meter, convey or pump gases or other fluids fed to the interior of the stator. Where the energy convertor is in the form of a rotary internal combustion engine, the chambers formed between the vanes are also effective for blending a fuel mixture, igniting the mixture, cooling the vanes and rotor, absorbing torque for efficient compression, and absorbing expansion for efficient power output.

Another object of the invention is the provision of an energy convertor of the character described which is particularity adapted for application as a rotary combustion engine, in which the need for valves and actuators at the intake and exhaust ports is obviated, and in which unlimited areas are available at the intake and exhaust stations for single or multiple ignition and for large ports located to permit gases to flow without restriction, thereby eliminating the choking flutter, inherent in reciprocating engines, which limits engine speed.

Another object of the invention is to provide a combustion engine of the character described in which the vane and vault structure is such as to permit a wide range of design in the choice of proportion between the maximum volume ingested by a travelling chamber in its compression phase and the maximum volume of the same chamber in its combustion expansion phase, to realize the gain in thermal efficiency resulting when the thermal expansion volume is larger. The engine also permits design choice to increase and smooth peak torque frequency by simply adding vanes to the rotor.

Another object of the invention is to provide a rotary engine of the character described which provides clean firing in presenting for ignition a compact combustible charge in a trough without widely lagging spacing or crevices, thereby completing first-ignition in the upstream reaches of the trough and thus avoiding carryover to exhaust of CO and CH as trailing, under-heated remnants of the charge.

Still another object of the invention is the provision of a rotary engine of the character described which provides inherent balance of the rotor assembly, eliminating any need for a flywheel or counterweights which, in stop and go operation of an automotive engine for instance, in their inertia absorb power and increase fuel consumption considerably.

Still another object of the invention is to provide a rotary engine of the character described in which a combustible gas charge is brought to ignition while spinning rapidly in a trough with the swirl desired for rapid and complete combustion.

A further object of the invention is the provision of a rotary engine of the character described in which the structure of the hinged vanes is such as to provide effective sliding seals at the vane outer faces engaging the stator, thereby eliminating the necessity for stationary abutment seals. The bearing line of the vane outer faces is broadened and maintained at an optimum width by a film of lubricating oil, and the vane contour is so designed as to reduce wear on the vanes to a minimum. Simple and effective seals are also provided on the vane ends and the rotor end corners adjacent the adjacent walls of the stator.

A further object of the invention is the provision of a combustion engine of the character described which operates without the usual rigid, locked cycling sequences which exclude all processes except combustion gas compression and expansion processes, and which limit the proportion of compression chamber volumes to expansion chamber volume to 1:1 ratio. The unlocked cycling of the engine is such as to permit bays and connections to be inserted into the stator periphery for compressing air, so that a compressed air central station consists of a single stator with a single rotor containing the prime mover and the air compressor, each travelling chamber of the rotor vanes serving alternately as a fuel compressor, a combustion chamber and an air compressor in each revolution of the rotor.

In accordance with the invention there is provided an energy convertor which comprises a hollow housing having end walls enclosing a central section constituting a stator having therein a chamber of generally circular shape defining an inner chamber wall. A cylindrical rotor is mounted for rotation about an axis central within the chamber, the rotor having a generally circular outer surface, and a plurality of vanes are pivotally mounted at equally-spaced points about the circumference of the rotor. The rotor is also formed with spaced troughs underlying the respective vanes, each trough being sized to receive the overlying vane in a retracted position therein with the vane outer surface contained in the outer surface of the rotor. The inner stator wall is formed with at least one arcuate vaulted bay of greater radius from the center of the rotor than the basic circular extent of the stator wall, and at least one abutment station continuous with the bay. The abutment station constitutes a location on the stator inner wall of minimum radial distance from the rotor axis, and is positioned to depress the vanes into retracted position within said troughs as the vanes travel past the abutment station. The vaulted bay enables the vanes to pivot outwardly from their retracted position to extended positions in which the outer vane surfaces engage the surfaces of the bay, with each pair of adjacent vanes forming therebetween a travelling chamber, the volume of which increases and decreases as the vanes move between their extended and retracted positions as the rotor turns within said stator.

In one preferred form of the invention, the energy convertor is a rotary internal combustion engine having at least one ignition station, at least one fuel inlet station and at least one gas outlet station, and in which at least one of the vaulted bays constitutes a compression bay with another vaulted bay constituting a combustion and expansion bay downstream of the compression bay. Each ignition station is located adjacent an abutment area between each compression bay and its downstream combustion expansion bay. Each travelling chamber increases in volume as it enters the compression bay to collect a charge of fuel mixture therein, decreases in volume as it leaves the compression bay to compress the fuel charge, transports the compressed fuel charge past the ignition station at the connecting abutment, then increases in volume as it enters the combustion expansion bay to accept power from the combustion expansion of the ignited fuel charge upon the leading vane of the travelling chamber, and finally decreases in volume as it leaves the combustion expansion bay to exhaust the combusted fuel charges through the gas outlet station.

Additional objects and advantages of the invention will become apparent during the course of the following specification when taken in connection with the accompanying drawings, in which:

FIG. 3 is an end elevational view of the engine of FIGS. 1 and 2 with a stator end section removed to reveal the interior of the stator and the rotor therein, a portion of the rotor being broken away to show inner construction;

FIGS. 5A through 5F are schematic end elevational views of the interior of the engine as illustrated in FIG. 3, showing the progressive stages of a chamber formed between a pair of vanes during one complete revolution of the rotor;

FIG. 13 is a diagrammatic view showing the configuration of the stator inner wall surface of the engine of FIG. 12;

FIG. 14 is an end elevational view of the engine of FIG. 12 with the stator end section removed to reveal the interior of the stator and the rotor therein;

Referring in detail to the drawings, and particularly to FIGS. 1-11 there is shown a preferred embodiment of rotary engine made in accordance with the present invention and having, for example, a five-vaned rotor and one firing station. The engine includes a housing having a central cylindrical section 10 and two end sections 12 and 14 which close off and seal the central section. Each end section 12 and 14 has an inner endplate 15.

Figure 1:
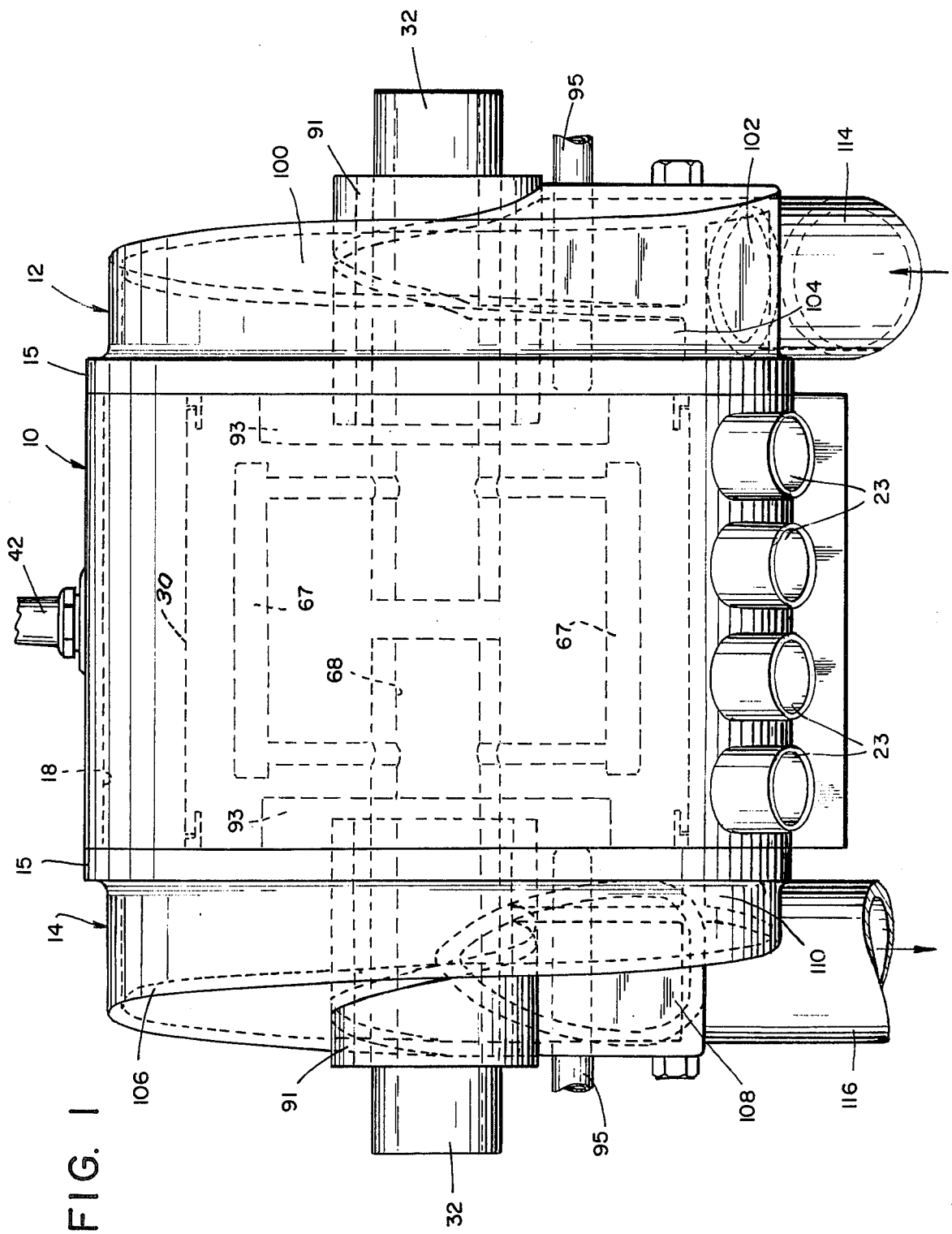
FIG. 1 is a side elevational view of a rotary internal combustion engine made in accordance with the present invention and having five vanes and one firing station.

The housing central section 10 constitutes the engine stator and comprises a cylindrical body having a thick wall 16 formed with passages 18 therein. A fuel inlet duct 20 extends through the body wall 16 and communicates with the hollow interior of the central section 10 through a plenum 19 and one or more inlet ports 21. One or more gas outlet ports 22 are also formed in the body wall 16 at a selected point and communicates with one or more outlet ducts 23 (FIGS. 1 and 3). The hollow central section 10, as shown in FIG. 3, is so formed that its inner surface is in the shape of a double lobed circle with two arcuate vaults 24 and 26 located in opposed sectors thereof.

Mounted within the housing central section 10 is the engine rotor 30, the rotor being of cylindrical shape and being rotatably mounted by a hollow shaft 32 extending through the center thereof and through the housing end sections 12 and 14. Pivotally mounted on the rotor 30 are the five vanes 34, each vane having an enlarged end 36 of circular cross-section which is mounted as a journal in a correspondingly-shaped socket or recess 38 in the rotor 30.

As shown in FIG. 3, each vane 34 has a thin elongated body portion of shallow curvature, and the surface of rotor 30 is formed with troughs 40, of corresponding shape, in registry with each vane to permit the vane to retract into the rotor with its outer surface embraced in the circumference thereof. The vane extent provides a broadly congruent outer surface for all of its varying postures against the stator wall, and that wall bearing line, even as broadened by a lubrication film, is fully contained on the vane's congruent outer surface at its most extreme reach from the vane journal 36.

Accordingly, the outer surface of the vane is formed by a compound curve which varies in radius from a maximum at the heel portion to a lesser radius forming the surface adjacent the tip of the vane. The curve of the heel portion is tangent to the journal surface when the vane is fully retracted and coincides with the contour of the rotor, and is therefore of maximum practicable compatibility with the configuration of the stator wall surface under an abutment, where the vane attitude giving leverage for centrifugal force needs a maximum stator wall seal bearing surface. Thus, the radius of the compound curve of the vane's outer surface is identical to that of the rotor in the heel portion and outward for a selected distance, where the radius is decreased gradually to present ultimately a congruent outer surface adjacent the vane tip fully to contain the bearing duty at the incident of an extreme reach. Deferment of this reduction of the vane contour radius is measured by the intent to provide for folding into the rotor surface a contour controlling penetration of the retracted vane tip into the rotor, whereby volume of the trough 40 is held to an optimum. That the bearing surface adjacent the tip is of smaller radius and less congruent with the stator wall than is the broader surface for bearing of the vane heel, is acceptable, as the bearing force at the tip never approaches the stress of that force intermittently loading the heel portion of the vane, and this radial loading decreases in intensity rather synchronously as the operative surface migrates outward along a vane in its cycle, and the loading increases rather synchronously as the engaged surface migrates inward.

The fuel inlet duct 20 communicates with a carburetor (not shown) located exteriorly of the engine, which proportions fuel and air in the usual manner. Lubricating oil for vane seals and joints, for vane journals 36, and for rotor end corner seals is also fed by a metering arrangement to the carburetor for distribution to the interior of the stator.

Located between the fuel inlet port 21 and the gas outlet port 22 is an ignition station 42 which may constitute a spark plug, but preferably is a hot plug element having a glow coil which is energized for starting. The stator inner wall is formed with an abutment area 44, (arc $a_3$ of FIG. 11), located immediately upstream of the fuel inlet port 21, and a second stator abutment area 46, (arc $a_1$, $a_2$), within which is located the ignition station 42. The two stator abutment areas 44 and 46 represent those areas in the vaulted stator wall which are spaced the least distance radially from the center of the rotor, and when the vanes 34 engage these abutment areas, they are brought to their retracted positions, folded into the outer surface of the rotor. The stator inner wall is formed with a compression bay 48 extending clockwise from the abutment area 44 to the abutment area 46, and a combustion expansion bay 50 extending clockwise from the abutment area 46 to abutment area 44.

As the rotor turns in a clockwise direction, as viewed in FIG. 3, the vanes 34 pivot outwardly under centrifugal force and make sliding engagement with the inner vaulted wall of the stator. Adjacent vanes form five respiring sealed chambers which cycle past stator bay stations to collect the fuel gas combustible charge from the fuel inlet duct 20, to compact the charge within a trough between adjacent vanes, transport the troughed charge under the abutment 46 and the ignition station 42 to the combustion expansion bay 50 which enlarges the volume between the adjacent vanes by an increasing radius of the confining stator wall, and to uncover the gas exhaust porting 22 by passage of the leading vane after the expansion power of its following chamber has been substantially spent.

Sealing means are provided on the rotor end corners and on the vane ends to complete with the stator walls a discrete chamber of pulsing volume between each vane and the adjacent vane, as will be presently described in detail.

Figure 5A:
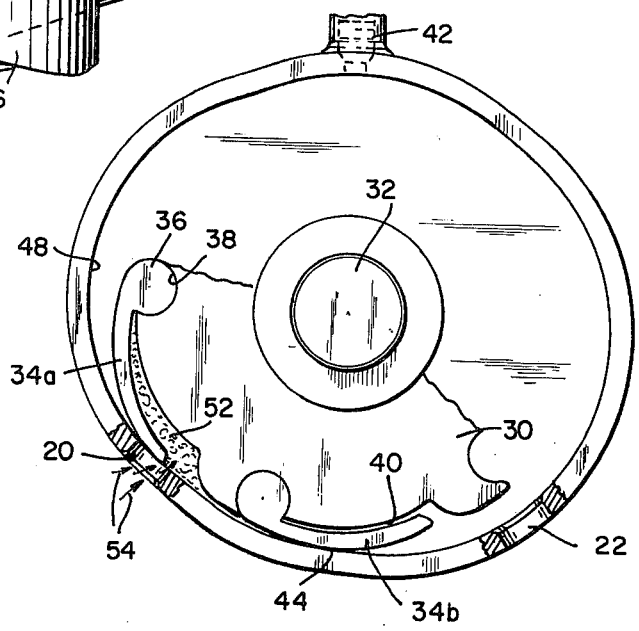

FIGS. 5A through 5F show the sequence of operation of two adjacent vanes 34a and 34b in forming therebetween a respiring chamber 52 enlarging volume for collecting a charge of fuel gas, compressing the charge, transporting the charge past the ignition station, enlarging volume to accept power from combustion expansion, and exhausting the combusted gas, during one 360° rotational cycle of the rotor 30. In FIG. 5A the trailing vane 34b is located at the abutment area 44 and has reached the point at which it is almost fully seated flush within the rotor trough 40 with its intermediate outer body surface sliding along the inner stator wall and making a seal therewith. The leading vane 34a has moved into the compression bay 48, and encountering the increasing radius of the latter, has begun to pivot outwardly from the rotor 30 to enlarge the respiring chamber 52. The tip of vane 34a has partially uncovered the fuel entry port 21 and a charge of combustible gas is being drawn into the chamber 52 in the direction of the arrows 54 in FIG. 5A.

As the rotor 30 continues to turn in a clockwise direction, the chamber 52 between vanes 34a and 34b is moved into registry with the vaulted portion of the compression bay 48 so that the chamber 52 is increased to its maximum volume and is capable of accepting a large charge of fuel during its passage by entry port 21. FIG. 5B shows the condition of chamber 52 as the tip of trailing vane 34b has first passed the fuel inlet port 21 and has cut off the feed of fuel to the chamber 52. The leading vane 34a, which has been pivoting inwardly, has almost reached its fully seated condition within the underlying rotor trough 40. The chamber 52 is now commencing to be diminished in volume so as to compress the fuel charge therein.

Figure 5C:
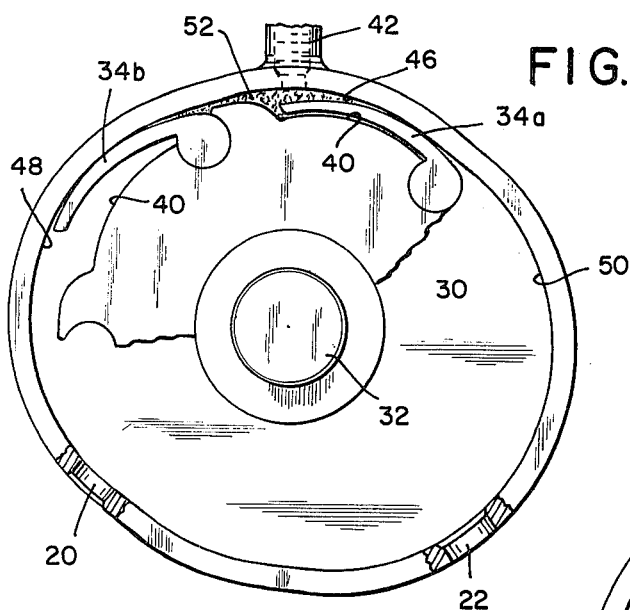

In FIG. 5C, the chamber 52 has moved to a position in which its leading end has just encountered the ignition station 42 and the fuel charge therein is fired by the hot plug thereof. In reaching this position, the confining stator wall has caused the vanes 34a and 34b to pivot inwardly, and the chamber 52 has been reduced to a very small volume, as shown. The fuel charge within the chamber 52 is therefore highly compressed. The leading vane 34a is almost fully retracted and seated within its rotor trough 40, with a mating portion of its body surface engaging the stator wall at the stator abutment area 46 so as to provide an effective front seal for the chamber 52. The trailing vane 34b is still extended, and is engaging the stator wall with a compatible portion of its outer surface.

Further movement of the rotor causes the chamber 52 to increase in volume, as the chamber encounters the combustion expansion bay 50. The fired charge within the chamber 52 therefore expands rapidly and applies force against the leading vane 34a. The leading vane 34a is applying torque to the shaft 32 by the reaction to combustion expansion between its radial rise above the rotor radius and the stator wall sloping back to the seal of the trailing vane 34b against the stator abutment area 46.

Figure 5D:
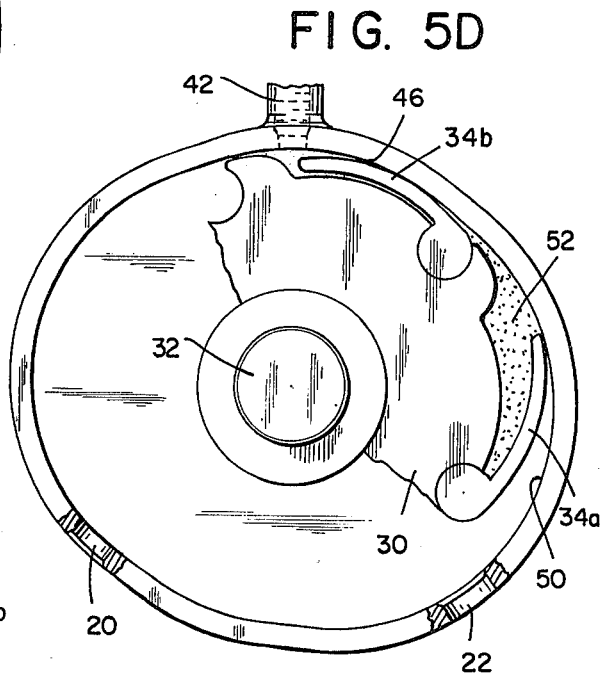

In FIG. 5D, the chamber 52 has increased in volume, in reaching the vault rise of the combustion expansion bay 50, and the leading vane 34a, engaging this vault rise, has pivoted outwardly to its position of maximum extension. The expanding ignited fuel gases in the chamber 52 are applying a large torque force to the exposed rear surface of vane 34a, and the vane 34a is engaging the inner stator surface in an extreme reach from its journal. The trailing vane 34b is in its retracted position and is forming a seal against the stator abutment area 46, and the radial rise of the leading vane 34a above the radius of the stator abutment provides the effective area upon which the pressure of gas in the chamber 52 acts to deliver power to the rotor.

Figure 5E:
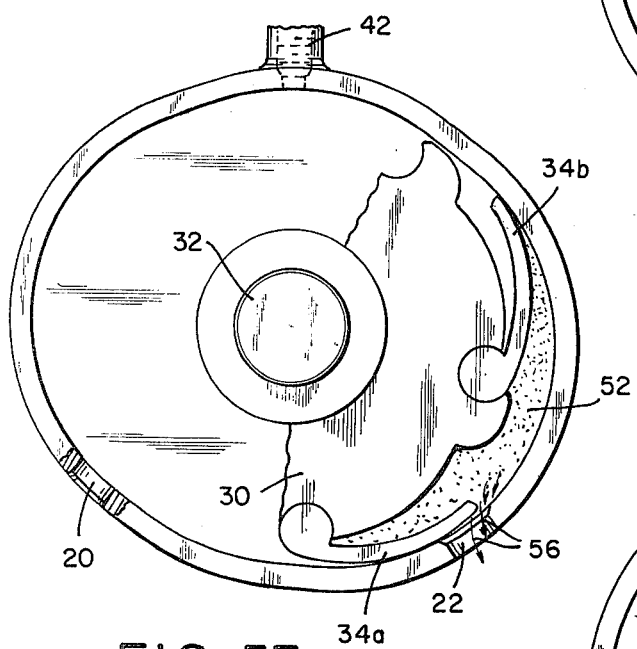

In the stage of the cycle shown in FIG. 5E, the leading vane 34a has just uncovered the gas outlet port 22, and the chamber 52, passing the downstream portion of the combustion expansion bay, is beginning to decrease in volume so as to force the contained exhaust gases out through the outlet port 22 in the direction of the arrows 56. The gas outlet port 22 is uncovered after the expansion power of the chamber 52 has been substantially spent against the leading vane 34a. Generally, the usefulness of the contained gas volume is ended at the time the trailing vane acquires the same loft as the power vane, which is also at the time at which maximum volume in the chamber begins to diminish. Notably, the chamber next following has started to deliver power just before power pressure of this chamber 52 was spent, and the torque variation curve for this engine benefits accordingly. As the chamber 52 continues to move, it grows considerably smaller in volume, so that the contained gaseous products of combustion are exhausted through the outlet ports 22 as they become completely uncovered.

The hot exhaust gases are carried through outlet port branches 23 (FIG. 1) leading from the gas outlet ports 22 to an outside header, with a sleeve of insulation over each branch, whereby local thermal differential stresses in the stator structure are minimized.

Figure 5F:
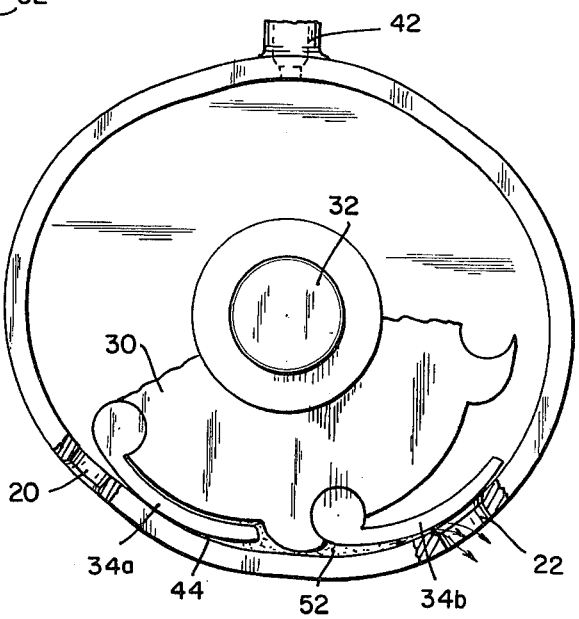

In FIG. 5F, the chamber 52 has reached the position in which it has been reduced to minimum volume, the leading vane 34a now bearing on the stator abutment 44 and moving in its posture of extreme retraction. The trailing vane 34b is overlying the gas outlet ports 22, but is still slightly inclined and is engaging the stator wall adjacent its tip portion. The heel portion of the trailing vane 34b is spaced slightly from the stator wall, and exhaust gases are still discharged through the outlet port 22. Shortly thereafter, the trailing vane 34b will shut off the outlet ports 22 and the trough between the vanes 34a and 34b will carry a fraction of the products of combustion past the stator abutment 44 for recycling through the compression bay.

Figure 11:
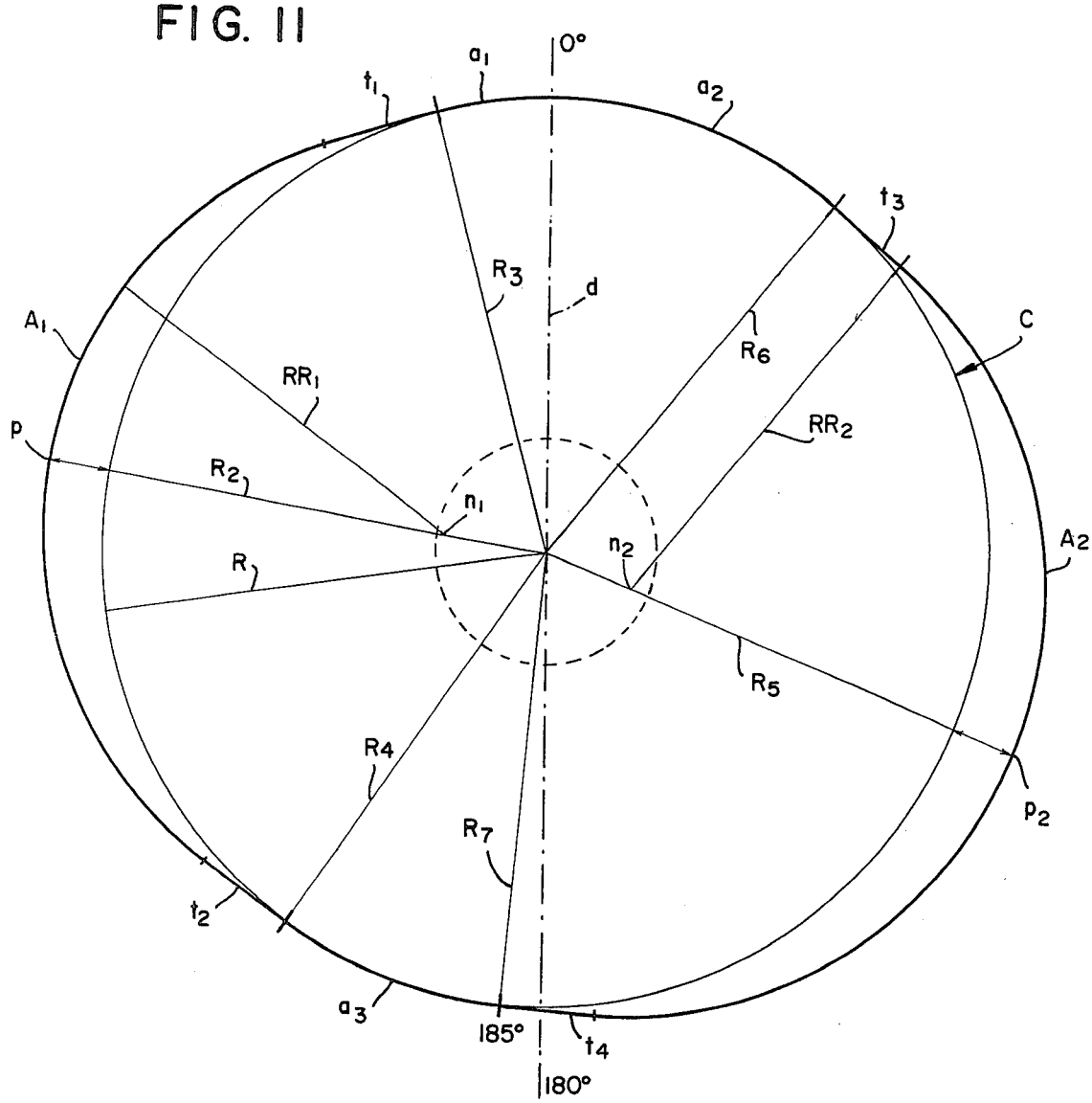
FIG. 11 is a diagrammatic view showing the configuration of the stator inner wall surface and the manner in which it is constructed.

FIG. 11 illustrates the manner in which the inner wall of the stator 10 is constructed in the configuration of two vaults raised on a circle. From the center of the stator, which corresponds to the center of the rotor 30, a circle C is constructed, with a radius R which is slightly larger than the radius of the rotor 30.

From a diameter $d$ of the circle C, which diameter extends between the 0° and 180° points of the circle, an arc $a_1$ of 15° is measured in a counter-clockwise direction from the 0° point of the circle, and an arc $a_2$ of 40° is measured in a clockwise direction. Near the opposite end of diameter $d$, from the 185° point on the circle an arc $a_3$ of 30° is measured in a clockwise direction.

A straight tangent $t_1$ is drawn counter-clockwise from arc $a_1$, as shown in FIG. 11, and at the opposite side of the circle, a straight tangent $t_2$ is drawn clockwise from arc $a_3$. A ray $R_2$ bisects the angle between rays $R_3$ and $R_4$, which intersect the tangent ends of respective straight tangents $t_1$ and $t_2$. This ray $R_2$ is extended to point $p$ beyond the circumference of circle C for a distance representing the desired height of the bay or rising vault to be formed. Through this point $p$, arc $A_1$ is drawn with its center $n_1$ on the bisecting ray $R_2$ and of such radius as to pass through the point $p$ while tangent to the two straight tangents $t_1$ and $t_2$. The arc $A_1$ has a radius $RR_1$.

At the right-hand side of circle C, a straight tangent $t_3$ is drawn clockwise from arc $a_2$, and a straight tangent $t_4$ is drawn counter-clockwise from arc $a_3$. A ray $R_5$ bisects the angle between rays $R_6$ and $R_7$ which intersect the tangent ends of respective straight tangents $t_3$ and $t_4$, and it extends beyond the circumference of circle C by a selected distance to a point $p_2$. An arc $A_2$ is drawn through the point $p_2$ tangent to the two straight tangents $t_3$ and $t_4$, the arc having a center $n_2$ on the ray $R_5$ and itself has a radius $RR_2$.

The aforementioned construction results in a stator interior surface having a basic circular shape conforming to the exterior of the rotor mounted therein, with two bays gradually rising and returning to the basic radius as shallow barrel vaults from abutments over the basic circle. Referred to the clockwise transport of gas in the stator, the upstream and downstream ends of both bays are formed by the tangents $t_2$, $t_3$, and $t_4$, $t_1$, which tangents provide respectively transport departures from and approaches to the stator abutments at the proper points in the course of travel of the respiring chambers.

The construction of the stator inner wall is such that it interacts with the size and shape of the rotor vanes to provide effective vane sealing continuously, with especial enforcement of vane sealing inherent at critical events in the combustion cycle, while affording tolerable specific bearing pressures for the transient sealing lines so as to make possible a long service life for the wearing metals.

Figure 4:
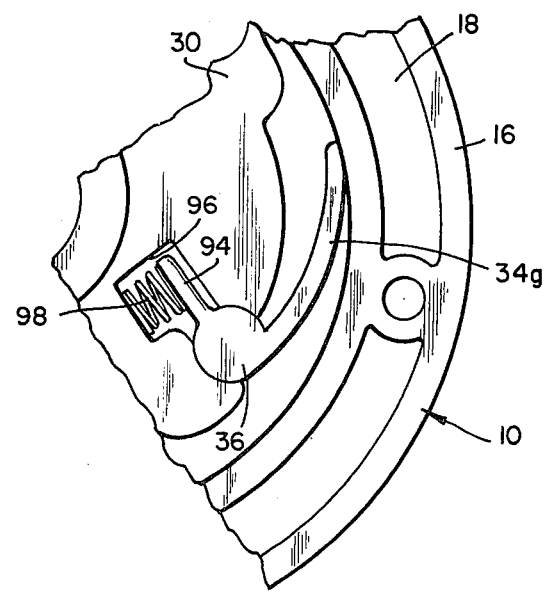
FIG. 4 is a fragmentary elevational view of a portion of the rotor and stator of a modified form of engine having an alternate manner of mounting the vanes on the rotor.

The interaction of the vanes 34 with the stator wall to change the size and shape of the respiring chambers 52 therebetween and to provide seals for the chambers, is of course influenced by the size and weight of the vanes with relation to the size of the rotor and stator. In one operative form of the embodiment shown in FIGS. 1-11, the rotor 30 has a basic diameter of four inches and is four inches long, operating at 6000 rpm with a speed variance of only a few thousand rpm plus or minus. The engine may be rated for 25 horsepower at 6000 rpm. The vanes 34 are of a weight corresponding to the density of cast iron. Obviously, other operating speeds may be achieved by changing the weight or size of the vanes 34, the maximum speed being largely determined by the specific pressure of a vane bearing on the stator wall, and the minimum speed determined by the mass of a vane adequate to secure the stator wall seal at such speed. To supplement the vane centrifugal force and secure the stator wall seal for a range of lower speeds, spring loading of the vanes may be provided, as shown in FIG. 4 and described in detail hereinafter. Springs to unload the bearing pressure will provide for a higher speed of operation.

Since the vane operation is dependent upon forces derived from its mass, it will be apparent that on changing the size of the engine, the sizes of the component parts, such as vanes, rotor and stator, cannot be increased or decreased in a simple geometric ratio (or to scale).

It will be seen in FIG. 3 that each of the five chambers 52, formed between successive adjacent pairs of vanes 34, is at all times engaged in one of the phases of the combustion cycle. To induce maximum flow by fluid respiration of chambers, the stator inner wall is so constructed that each chamber is constantly active in a pulse which is increasing the chamber volume or a pulse which is decreasing the chamber volume. The dwell of maximum or of minimum volume in a chamber should be as brief and fleeting as permissible by good design practice, for example, in the assignment of high radial acceleration stresses for a function of the materials of construction. Purposeful exceptions for a longer dwell may occur, as by design at the ignition abutment 46 to prolong the strong sealing attitude of a retracted vane, or at the fuel intake ports to prolong the vacuum for maximum gas ingestion.

Referring to FIG. 3, it will be seen that when a vane 34 approaches the fuel inlet ports 21, it leaves the constant radius of abutment 44 and enters the guidance first of straight tangent 62 ($t_2$ of FIG. 11) and then of the arcuate vault 24. The centrifugal force at a constant radius acting on the vane in the abutment 44 is reduced sharply by the increasing radius of guidance as it enters the planar surface of the tangent 62, and this reduction of vane pressure on the stator wall persists but with decreasing intensity as the vane continues to pivot outwardly until the vane wall bearing reaches the central portion of maximum rise of the vault 24. In this vault apex, guidance of the vane mass is momentarily at a constant radius from the controlling center of the rotor and the force loading the vane bearing on the stator wall is precisely that of centrifugal force on that radius except for the force from gas pressures acting through the vane surfaces, which is negligible in this sector. The unloading effect of positive radial acceleration, with the vane pivoting outward sharply as guided by the planar surface 62, and less and less sharply in the confinement of the rising curve of the vault 24, has decreased from a large maximum to zero in the succession. It will be appreciated that the mass of the vane tip following the straight tangency of the planar surface 62 has no centrifugal force, but that the centroid of mass for the vane body 34 is drawn by the vane journal 36 to traverse an arc for sufficient centrifugal leverage to maintain the vane tip seal in this mild atmosphere where vacuum exists on both faces of the vane. Then the large maximum reduction of centrifugal force under the guidance of the planar surface 62 is not sufficient to spoil the vane tip seal in the atmosphere of vacuum, and the spoiling effect of positive radial acceleration decreases to zero at the apex of the vault 24, where now the centrifugal force must continue to hold a seal against the vault wall while it has begun to compress the combustible gas charge downstream of the same vane 34.

On the downstream slope of the vault 24, the stator wall begins to press in the vane against its tendency to pivot outwardly and the vane slides along the wall surface with negative radial acceleration, a large force which has arisen from zero at the vault apex and will become maximum at the tangency of arcuate vault 24 and planar surface 64, whereby the growing enforcement of sealing is synchronous with the growing need for sealing force as the combustible charge is reduced to a small volume of high pressure. It will be observed that the sealing pressure of the vane against the stator inner wall progresses from a rather small force to a relatively large force in its traverse of the compression bay between the abutment 44 and the abutment 46, diminishment of centrifugal force by positive radial acceleration being large in the planar surface 62 and reduced to no effect at the apex of the compression bay, where centrifugal force is momentarily unmoderated but is supplemented thereafter increasingly by negative radial acceleration for a large total sealing force ultimate before the planar surface 64. It will be further seen that the path of traverse of a vane under the guidance of an arcuate vault such as vault 24 inclines increasingly toward the controlling center of rotation along the path from the upstream abutment of the vault to the downstream abutment, that the vane body in the traverse deploys little centrifugal pressure at the beginning of its arcuate path but steadily increases pressure in the traverse to a comparatively very large terminal pressure, and that the angle of incidence between the line of traverse and an arc with a radius to the controlling center may be a measure of the centrifugal pressure instant. Lastly, it will be seen that the forces causing wear and friction are small at the beginning of the vane transit of the compression bay, and thereafter are gainfully suppressed, being opposed to a synchronously increasing compression duty.

The vane 34 passes the planar surface area 64, corresponding to the tangent $t_1$ in FIG. 11, and engages the stator abutment area 46, corresponding to the arc $a_1$, $a_2$ of basic radius shown in FIG. 11. At this point the modifying effect of negative radial acceleration, which was a large and maximum amplification of centrifugal force on entering the tangent area 46, has diminished and now becomes zero as the mass of the vane resumes gyration at a constant radius from the controlling center, and the accordant centrifugal force will be constant throughout the vane traverse under the guidance of the abutment area 46. Thus reduced, centrifugal pressure alone would not be sufficient to hold a seal of the vane against the stator wall, to confine the highly compressed combustion charge and the sharp rise of chamber pressure at first ignition, were it not for the diminished area of the vane surface to which the force of the chamber pressure is now confined, and were it not for the multiplication of centrifugal leverage which now exists in the vane's center of mass overhanging the wall bearing line. Referring to FIG. 5B, the vane 34a is shown engaging the tangential planar area 64 before the ignition abutment area with the sealing line of the engagement bearing upon the heel portion of the vane outer surface so as to multiply by leverage the centrifugal force in the vane mass which overhangs the sealing line, thereby increasing sealing pressure. Further, the outer surface of the vane exposed to unbalanced pressure of gas during passage under the abutment, as measured in this profile, is only a small fraction of an inch wide.

Actually the centrifugal force, as reinforced by the levering posture of the vane, may prove to far exceed the force required to seal against high pressure gas operating against such a small area of the vane. In practice, therefore, additional clearance may be provided between the rotor 30 and the abutment 46 to move the sealing line outward from the heel portion of the vane, thus to reduce the leverage of centrifugal force loading the wall bearing and in the same modification to increase the area for gas pressure to oppose and relieve the wall load. Clearances between the rotor and the stator abutments of this invention are not in any way critical, nor do they in any way affect a seal except in providing guidance for a sealing attitude of the transient vanes.

As the vane lost the large sealing reinforcement of negative radial acceleration in its transit of the planar area 64, it at the same time gained the larger sealing reinforcement inherent in the centrifugal leverage and the reduced gas pressure exposure of its retracted attitude. In its transit of the compression bay the vane was found to acquire the steadily increased centrifugal pressure needed to oppose a steadily increasing reaction of compressing gas rather synchronously, just so here the vane has acquired on the tangent area 46 a leverage and a reduction of effective gas-pressurized surface to compensate rather synchronously for the termination of radial acceleration enforcement. Once again the forces causing wear and friction are gainfully suppressed by the normal, gas-confining function of the engine part.

Each vane 34 first serves with good economy as a trailing vane, to compress the gas in the chamber before it, and then confine the gas through ignition and the peak of combustion expansion. The same vane 34 then passes beneath the ignition station and itself becomes the power vane for the following chamber. The engine operates with no wide variability from a normal high speed, so that a constant location, that is a constant timing, of ignition is satisfactory, and the choice of fuel may modify the extent of the abutment downstream which is needed to hold the vane in its strong sealing posture until combustion propagates a strong sealing pressure beneath it. At this vane's attitude under the abutment 46 of FIG. 3, expanding pressure in the downstream chamber is more than half spent, and is acting downward on a very small area of this vane, while the peak combustion pressure presently to arise in the upstream chamber will act rather unbalanced upward on an equally small area. Then the vane enters the guidance of the planar surface area 66, a tangent plane leading to the arcuate vault 26 and initiating abruptly a relaxation of pressure at the wall sealing line, and the vane pivots outwardly in positive radial acceleration. The diminishing pressure in the downstream chamber is by now insignificant, the dominant force being that of initial combustion expansion acting upon a growing area under the vane with nearly unbalanced pressure. But radial acceleration is once again to afford, in rather synchronous arrival, a large and gainful suppression of the forces of wear and friction while absorbing, this time in positive radial acceleration, a large part of the reaction needed to contain the combustion expansion incident, from its peak to a small fraction of that maximum pressure.

Under the guidance of the rising wall of the arcuate vault 26, the vane 34 is permitted to pivot outwardly as the centrifugal pressure upon its wall bearing is relaxed for positive radial acceleration, and this unloading is large and abrupt and is reduced gradually to become zero when the vane tip arrives at the vault apex (point $p_2$ of FIG. 11) even as the opposing force of combustion expansion decreases from its maximum to a small fraction thereof in the same interval.

In conventional internal combustion engines, the structural materials are usually subjected to maximum stresses associated with simultaneous maximum temperatures at the zone of peak combustion pressure, so that this zone is found to be critical. As previously described, in the engine of the invention herein, the bearing seal stress force resultant of maximum gas pressure is strongly suppressed in that region of maximum temperatures in the structural materials. Rather, the largest and most critical stress on the materials of this engine occurs in the vane wall bearing at the downstream end of the arcuate vault 26, where the atmosphere has been appreciably reduced in temperature by expansion of the gas to ambient pressure, where the stator wall is remote from the zone of fire origins and is water-cooled, and where the vane 34 will have had proximately a long, firm, wiping contact exposure from its tip to its heel portion against the water-cooled downstream slope of the combustion expansion bay 26. The large stress is the result of negative radial acceleration in a vane without the opposing and attenuating presence of gas pressure downstream of the vane.

The vane 34 traverses the downstream half of the bay with negative radial acceleration increasing from zero at the vault apex to become a maximum at the tangency of the planar surface area 60, which is represented as $t_4$ in FIG. 11. Losing all of the sealing force of negative radial acceleration abruptly upon entering the guidance of the abutment 44, it has assumed the retracted attitude which multiplies through leverage the now constant wall bearing force of centrifugal mass. The vane 34 has expelled the spent products of combustion through the ports 22 in its passage, excepting a fragment of volume which is propelled before it through the abutment to be recycled. The wall loading, which is multiplied by the leverage of mass in the retracted vane, may be reduced in a simple manner by providing a rather large clearance between the rotor 30 and the abutment, thus to reduce the leverage of the retracted vane and thus inconsequentially to further dilute the combustion charge with cycled exhaust gases. After its transit of the abutment 44, the vane 34 enters the tangent planar area 62 first through a vacuum and then to compression duty with a vacuum on its rear face, with performance as previously described.

The maximum normal operating speed and output power of this energy converter depend upon permissible bearing stress in the sealing face of a vane against the stator wall. The centrifugal pressure of the vane mass on the wall bearing seal is a major loading force, and the only other is the radial force component of occasional unbalanced gas pressure on the vane. The structural deployment of abutments and vaulted bays in the combustion engine have been shown to turn those two radial forces gainfully one against the other to reduce or to increase the specific bearing pressure at the most critical events in a cycle. It has also been shown that the curvature of the wallbearing face of a vane is more pronounced at its tip portion and decreases at its heel portion, where it is more shallow to further broaden the bearing line, and that this is the engaged area at the occurence of a maximum bearing load.

The structural forms of stator vaults and rotor vanes further provide five accomodations to maintain an oil lubricating film between the engaged surfaces of large bearing pressure.

(1) Loading in the sealing contact is transitory from negligible to maximum at least once in each revolution of the rotor.

(2) The lubricating film is constantly renewed, as ripples from the thicker film on areas of least wall pressure are swept by the vanes to areas of greatest wall pressure, 500 times per second in the case of an energy converter with five vanes operating at 6000 rpm. (3) The vane side of the bearing contact seeks a constant renewal of the oil film by itself migrating constantly from the heel portion to the vane tip and back. (4) There is a consistent remote guiding aspect of a journal to the bearing surface of its vane, upon which the journal imposes little wearing force; remote guidance assures a precision of engagements repeated between the vane and the stator wall for over their service life a wearing-in and mutual polishing of the surfaces for easy lubrication. (5) The accomodation of a surface of unfixed radius rotating inside and bearing upon a surface of fixed radii, allows the rotating surface to adjust outward in the wearing-in process of its service life to greatly prolong that life, as a small or large erosion of materials will not be equatable to an enlargement of sealing clearances in that the hinged surface will pivot outwardly to make up the difference precisely.

Alternative to the introduction of lubricating oil with the fuel mixture, positive circulation of lubrication to the vanes and to end seals of the combustion engine, and of other forms of the energy converter, may be a tributary to the circulation of oil through the main rotor shaft bearings. The annular spaces within the two ends of the rotor 30 and further bounded by stator end plates 15, rotor shaft bearings 91 and a periphery inside the rotor end corner seals, constitute two sumps 93 (FIG. 1) receiving oil which flows through the main bearings inward to the two sumps and is recirculated through drains 95 to a makeup sump and through a pump (not shown). Outside the rotor end seals, in the cycling of energy conversion, with respect to the stator there are one or more zones of constant fluctuating low pressure and one or more zones of persistently much higher pressure. Centrifugal pressure from the annular sumps tends to flow oil past the rotor end seals into the outer zones of low pressure, where it is swept into lubrication duty. Excess oil in the high pressure zones is urged radially inward past the rotor end seals and returns to the annular sumps, being forced by pressure superior to that of the centrifugal mass of oil. Inward or outward flow may be favored by impressing shallow vanes on the arcuate lands of the rotor end seals.

As shown in FIGS. 1 and 3, the rotor 30 is provided with a plurality of internal cooling channels 67 which communicate with a central bore 68 in shaft 32. Water fed to the hollow interior of the shaft 32 is circulated through the cooling channels 67 throughout the body of the rotor 30, for cooling the latter during its rotation.

Figure 6:
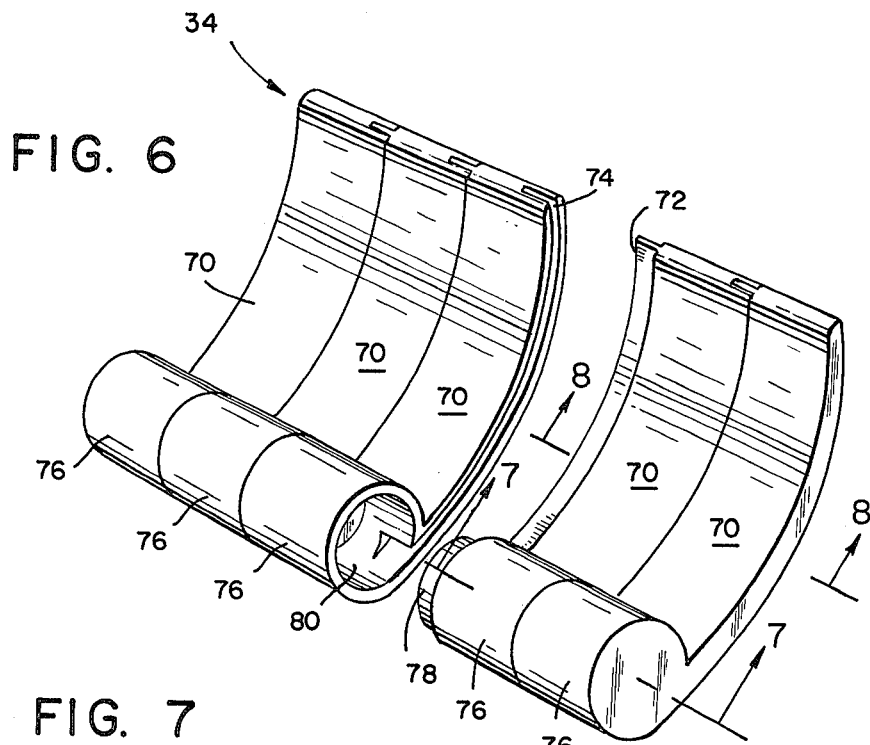
FIG. 6 is an exploded perspective view of one of the vanes of the engine of FIGS. 1-3, showing the vane in partially disassembled condition.
Figure 7:
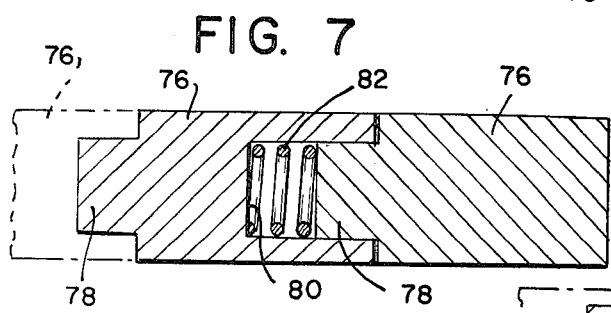
FIG. 7 is an enlarged section taken along line 7—7 of FIG. 6.
Figure 8:
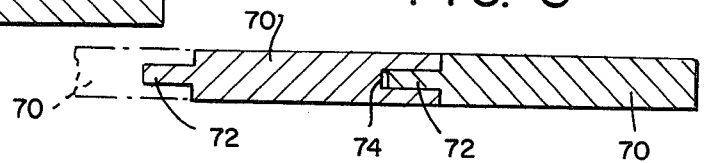
FIG. 8 is an enlarged section taken along line 8—8 of FIG. 6.

FIGS. 6–8 show the manner in which the vanes 34 may be segmented to accomodate thermal deformation and provide lateral seals against gas leakage past or through the vanes. As shown in FIG. 6, each vane 34 is formed of a plurality of segments 70, each formed with a tongue 72 extending along one edge, and a groove 74 extending along the other edge. The tongue 72 of each vane fits slidably within the groove 74 of the adjacent vane segment. At one end each segment 70 is broadened to form an enlarged cylindrical portion 76 which interfits with corresponding cylindrical portions of adjacent segments to form the enlarged end pivot portion 36 of the assembled vane. Each cylindrical portion 76 is formed at one end with a projecting circular plug 78 and at its other end with a circular socket 80. The plug 78 of each segment fits slidably within the socket 80 of the adjacent segment. A compression spring 82 is seated in each socket 80 to urge the segments 70 apart, thus maintaining uniform spacing between the segments, but permitting individual thermal expansion of each of the segments. The end segments of each vane may be made narrower than the intermediate segments and in their comparatively sheltered positions, they operate with minimal thermal deformation as they wipe along the cooled stator end plate with a wide sealing face.

Whether formed of a plurality of segments 70, or as an unsegmented unitary member extended between the stator end plates, the vane and its journal are readily dismantled for inspection by sliding the journal axially when the upper half of either stator end housing 12 or 14 has been removed, assuming the housings are horizontally split for this purpose. By turning the rotor enough to remove all of the vanes, direct visual inspection of all wearing surfaces may be made, including those in the regions of the intake and exhaust ports when both upper half end housings have been removed, and expecting only those in a small sector in the base of the stator.

Figure 9:
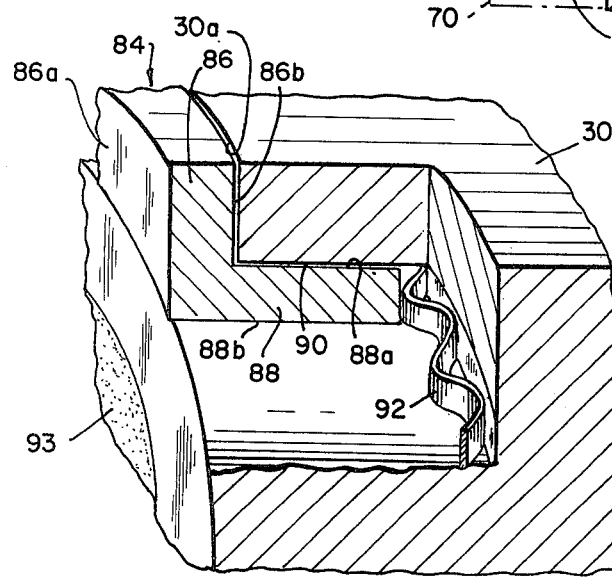
FIG. 9 is a fragmentary perspective view of a corner of the rotor which is partially broken away and shown in section to reveal the end corner seal mounted therein.
Figure 10:
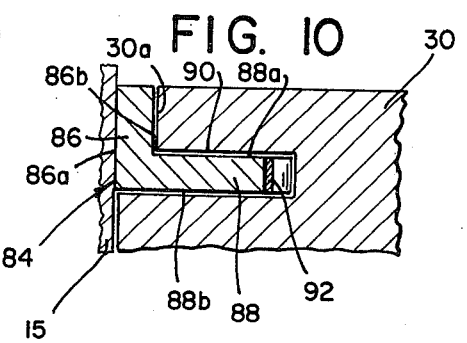
FIG. 10 is a fragmentary sectional view of the portion of the rotor shown in FIG. 9, showing the end corner seal mounted therein.

The sealing of the rotor with the end plates 15 of the stator may be improved by the use of end corner seals 84 on the rotor. As shown in FIG. 3, the faces of the end corner seals 84 extend along the edge of the rotor 30 between adjacent vane hubs 36 and are curved to follow the contour of the rotor surface. As shown in FIG. 9, the end corner seals 84 are of right angular cross section, the outer leg 86 being an extension of the rotor periphery. The inner leg 88 is slidably mounted in a correspondingly-shaped slot 90 in the rotor, and is urged outwardly by a leaf spring 92 to cause the face of outer leg 86 to bear upon the stator end plate. The leaf spring 92 is seated within the slot 90, and is of sinuous shape, urging the corner seal 84 under light pressure into engagement with the stator end plate. A thin wide film of oil is maintained between the outer face 86a of leg 86 and the confronting surface of the stator end plate 15, which oil film prevents the pressure from the adjacent travelling chamber from bearing upon the effective face 86a of leg 86 and from urging the end corner seal 84 in an inward direction. On the other hand, the leg 86 is made of a sufficient length such that its inner surface 86b provides a wide effective area exposed to outward gas pressure. When pressure in the adjacent travelling chamber increases, this pressure rise pervades in the space between the leg inner surface 86b and the confronting surface 30a of the rotor body, and is thus effective in urging the end corner seal 84 in an outward direction against the stator plate 15, to provide an effective seal. This pressure will not dissipate around the rear end surfaces of the inner leg 88, since under normal moderate pressure in the adjacent travelling chamber, centrifugal forces engendered by the rotating rotor will urge the corner seal 84 outwardly so that the surface 88a of the leg 88 makes sealing contact against the confronting rotor surface, while at peak pressures within the adjacent travelling chamber, such pressure urges the corner seal 84 inwardly so that its opposite surface 88b makes sealing contact against the confronting rotor surfaces.

This movement of the inner leg 88 radially inward and outward, making and breaking the seal of the leg sides to the sides of the slot 90 occurs alternately once in each revolution, is a slight pumping action extended sequentially over the entire periphery of the rotor. This pumping action, supported by centrifugal pressure in the spinning oil of the sumps, urges the seepage of oil radially outward past the end corner seal 84 adequate for lubrication of all parts in the compression and expansion bays. A general lubricant is metered by helical grooves (not shown) in the bearings 91 of main shaft 32 or by other means, to the annular sump 93 formed in rotor 30 and confronting each stator end plate 15, where it forms a constant pool peripheral against the rotor end corner seals 84 and the lands thereof, spinning just outside the sump drain and excluding, or removing by the centrifugal flotation process, vagrant bodies of gas occurring in the comparatively dense body of oil in the spinning pool and in all of the flow crevices communicating thereto from the chambers 52.

Referring to FIG. 5D, vane 34a is confining a charge in which the expansion pressure in the products of combustion is about to be spent and then voided to outside atmosphere. Centrifugal pressures of lubricant are urging a seepage of oil outward, past the sealing face 86a of outer leg 86 engaging the stator end plate 15 as well as past the sealing side 88a of inner leg 88 pressed against the outer side of the slot 90.

From its position in FIG. 5D the vane 34a and its companion end corner seal 84, confining only several atmospheres of gas pressure, travel to the exhaust voiding positions of FIGS. 5E and 5F, then through the situations of chamber vacuums shown in FIGS. 5A and 5B, and finally just before the heavy compression attitude of the vane 34a in FIG. 5C, the chamber pressure arises to obstruct the flow of lubricant seeping into the chamber. Thus, in fully three quarters of its cycle the chamber has been receiving oil and diffusing it to all of its parts, and the entire outer surface of the vane has received a coating with which, from its knee portion to its tip, the vane will stroke this one hot sector of the stator periphery and leave a film supportive to that borne by the succeeding vane.

Since the ends of the vane hubs 36 are urged outwardly by the springs 82 contained in the segmented portions 70, the ends of these vane hubs cooperate with the end corner seals 84 extending between these hubs, to complete effective end seals around the entire circumference of the rotor 30 at both ends thereof. Force to seal the outer hub face to the stator end plate is that of chamber pressure acting upon the annular inner hub end and in the adjacent crevice between vane segments. Brevity of the incident when chamber pressure is superior to the opposing centrifugal pressure of oil, and the presence of a considerable oil body in the spring cavity obstructing gas flow, satisfactorily inhibits blow-by to the sump.

Thus, in this simplified system for lubrication and sealing of joints, oil enters through the main rotor shaft bearings 91 (FIG. 1), drips to the bottom of the annular oil sumps 93, is entrained in the pools which spin just outside of oil recirculating drains 95 located a calculated distance inside of the path of the rotor end corner seals 84, seeps axially outward to the cavities and slot bottoms where springs are deployed, and forms reservoirs of oil in the cavities and slot bottoms solidly to baffle reverse flow of gas to the sumps in the regular but brief incidents of higher pressure in the chambers 52. The atmosphere in all of the travelling chambers 52 is pervaded by a mist of oil, diffused by the impact of vanes stroking the film on the water-cooled walls of the stator and by differential pressures regularly but momentarily breaching the oil seal of a joint such as the tongue-and-groove articulations between vane segments.

Where the vanes are of such light construction and of a contour which rather closely matches the mating stator vault surfaces, the centrifugal pressure of the vane upon the vaulted bays of the stator does not exceed the bearing capabilities of the engaged materials, and no counterbalance or spring force on the vanes is needed. Where, however, a wider or heavier vane is employed, it may be necessary to add a counterweight or spring force to the vanes. Such added force may also be employed to load the vane seal against compression and expansion forces where, at lower speeds, centrifugal force alone is not adequate. FIG. 4 shows for example, a vane 34g which is formed with an arm 94, projecting radially from the pivot journal thereof and movable within a recess 96 in the rotor body. A compression spring 98, seated within the recess 96, urges the vane 34g in a direction to engage the vault surface of the stator. At low rotor speeds the sealing contact of vanes with the stator bay walls may not be adequately sustained by centrifugal force, and the action of the compression spring 98 supplements the centrifugal force on the vanes at all speeds. Counterbalancing (not shown) and/or springs may be arranged with single or interrelating functions to load or unload the vane sealing pressure on the stator wall, for a lower or a higher rotational speed variability.

To provide effective water cooling for the stator, the stator end housings 12 and 14 are made in the form of water headers of scroll shape. As shown in FIG. 1, the end housing 12 is formed with a scroll-shaped header 100 having a wide end 102 from which the header gradually tapers to a narrow end 104 as it extends around the circumference of the end housing 12. The end housing 14 is similarly formed with a scroll-shaped header 106 having a wide end 108 and gradually tapering to a narrow end 110.

The scroll-shaped header 100 of end housing 12 is connected to the scroll-shaped header 106 of end housing 14 through the cross passageways 18 (FIG. 3) which extend transversely through the body of the housing central section 10, in such a manner that the wide end of each header 100 and 106 communicates with the narrow end of the opposite header and intermediate portions of each header communicate with portions of the opposite header having a corresponding inverse width dimension. Thus, the hydraulic pressure drop across each of the cross passageways 18 is equalized and at a minimum because of the scroll shape of the headers 100 and 106. With water friction to and through each cross passageway 18 equal, orifices may be provided at the entry to each, favoring flow through hotter sectors of the stator.

A water inlet conduit 114 communicates with the wide end 102 of the scroll-shaped header of end housing 12, and a water outlet conduit 116 communicates with the wide end 108 of the header 106 of end housing 14. Water is fed under pressure to the wide end 102 of the end housing 12 and in circulating through the scroll-shaped header 100, flows through the crosspassageways 18 to the opposite scroll-shaped header 106, through which it circulates before being discharged through the outlet conduit 116. The cross-passageways 18 closely overlie the stator vault walls so as to cool the latter, while the stator end section walls are cooled by the circulation of water through the scroll-shaped headers 100 and 106.

Figure 2:
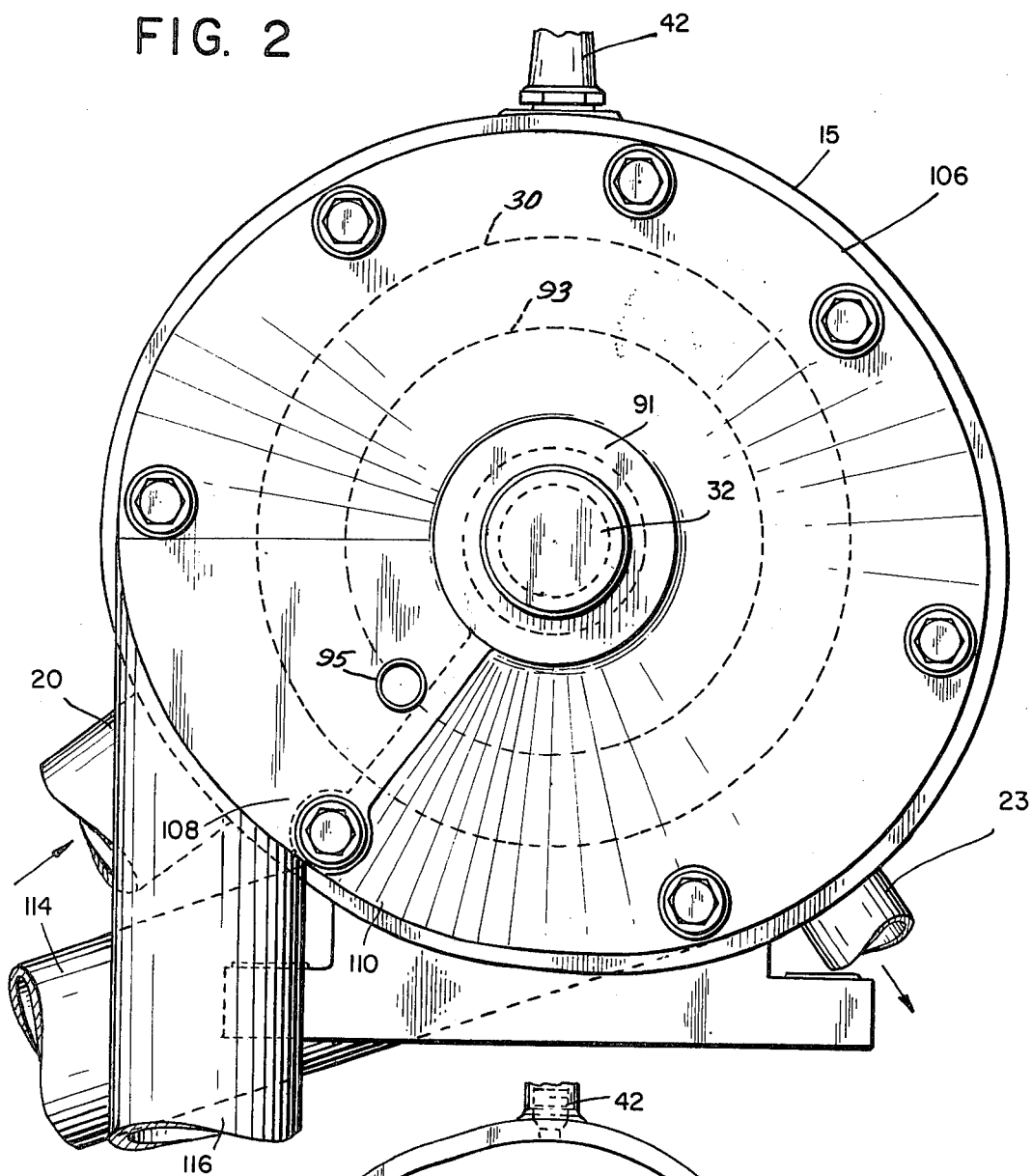
FIG. 2 is an end elevational view of the engine of FIG. 1.

In the embodiment described above, the exhaust combustion gases in the combustion expansion bay 50 at the end of the combustion cycle, are discharged through a plurality of gas outlet port branches 23 extending radially through the wall of the central cylindrical section or stator 10, as shown in FIGS. 1, 2 and 3. Alternatively, the exhaust ports may be arranged to lead axially through the stator end housings 12 and 14 to provide end exhausts for the engine, rather than radial exhausts. In this instance exhaust ports may be provided in each of the stator end housings 12 and 14, the mouths of these exhaust ports communicating with the downstream end portion of the combustion expansion bay 50. Such provision of end exhaust means is advantageous in that lubricating oil, which would otherwise be swept to peripheral exhaust ports, is less liable to escape through the end exhausts, so that waste of the oil is minimized. In addition, the tendency of exhaust ports in the vault periphery to increase specific bearing pressure on the vane tips and on the stator wall as stator bearing surface is removed, is eliminated where end exhaust ports are provided. Further, end exhausts are preferred where air cooling is introduced in the combustion expansion bay both upstream and downstream of the exhaust ports. The cross flow of cooled air injected radially upstream of the exhaust ports is able to travel through a long path to the exhausts while washing both the inside and outside of the vanes to reduce their temperature.

FIGS. 12 to 17 illustrate a modified embodiment of engine having two ignition stations opposed on the stator, each associated with a compression bay and an expansion bay. This engine has eleven vanes hinged to the rotor and forming therebetween eleven respiring chambers which travel successively through two complete combustion cycles during each revolution of the rotor.

Figure 12:
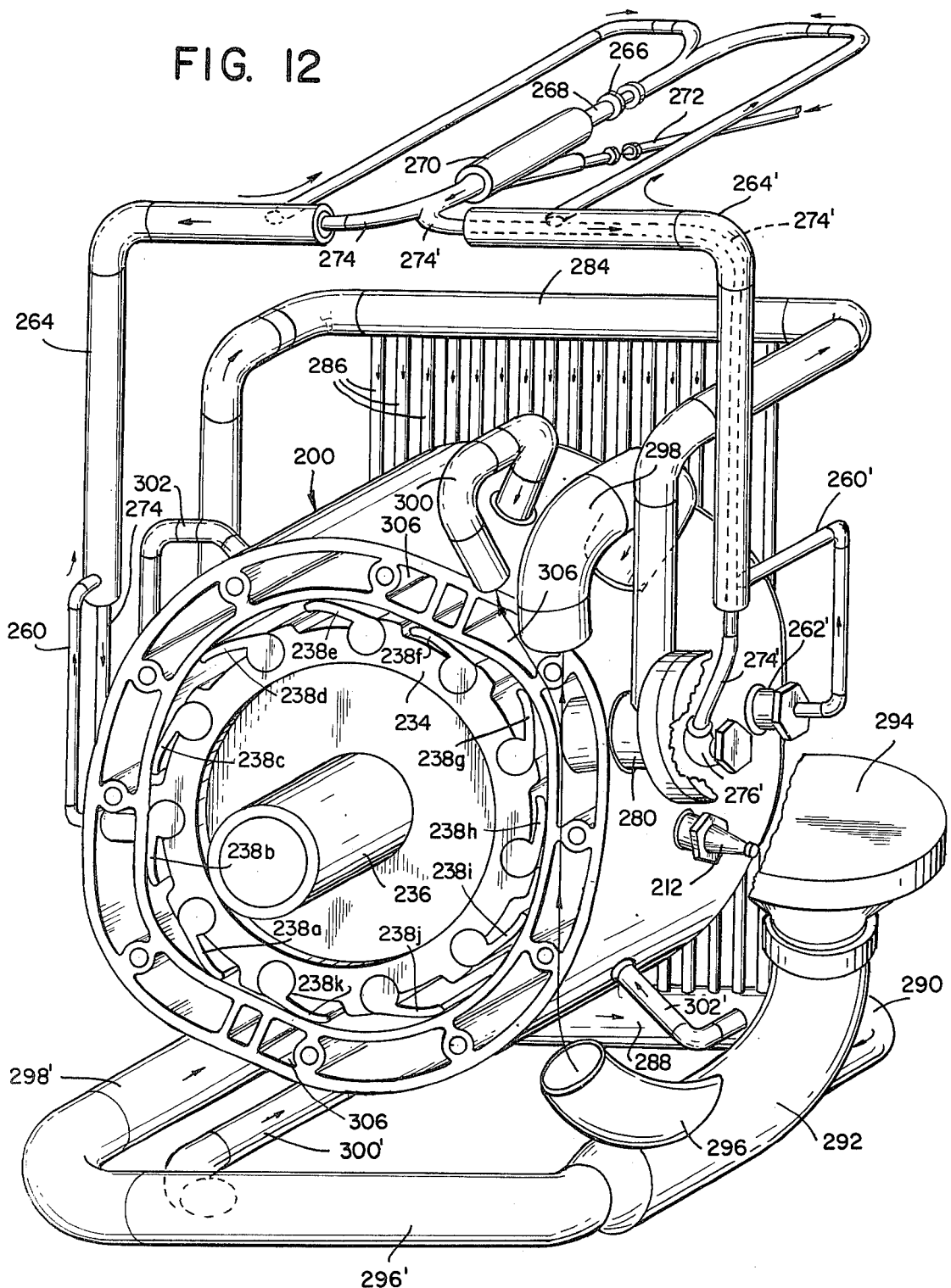
FIG. 12 is an isometric view of an alternative embodiment of rotary internal combustion engine made in accordance with the invention and having eleven vanes and two firing stations, with the stator front end plate removed to show the rotor and the vanes thereon.
Figure 16:
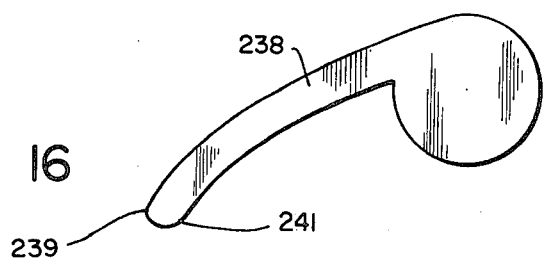
FIG. 16 is an enlarged end elevational view of one of the vanes employed in the engine of FIG. 12.
Figures 13, 14:
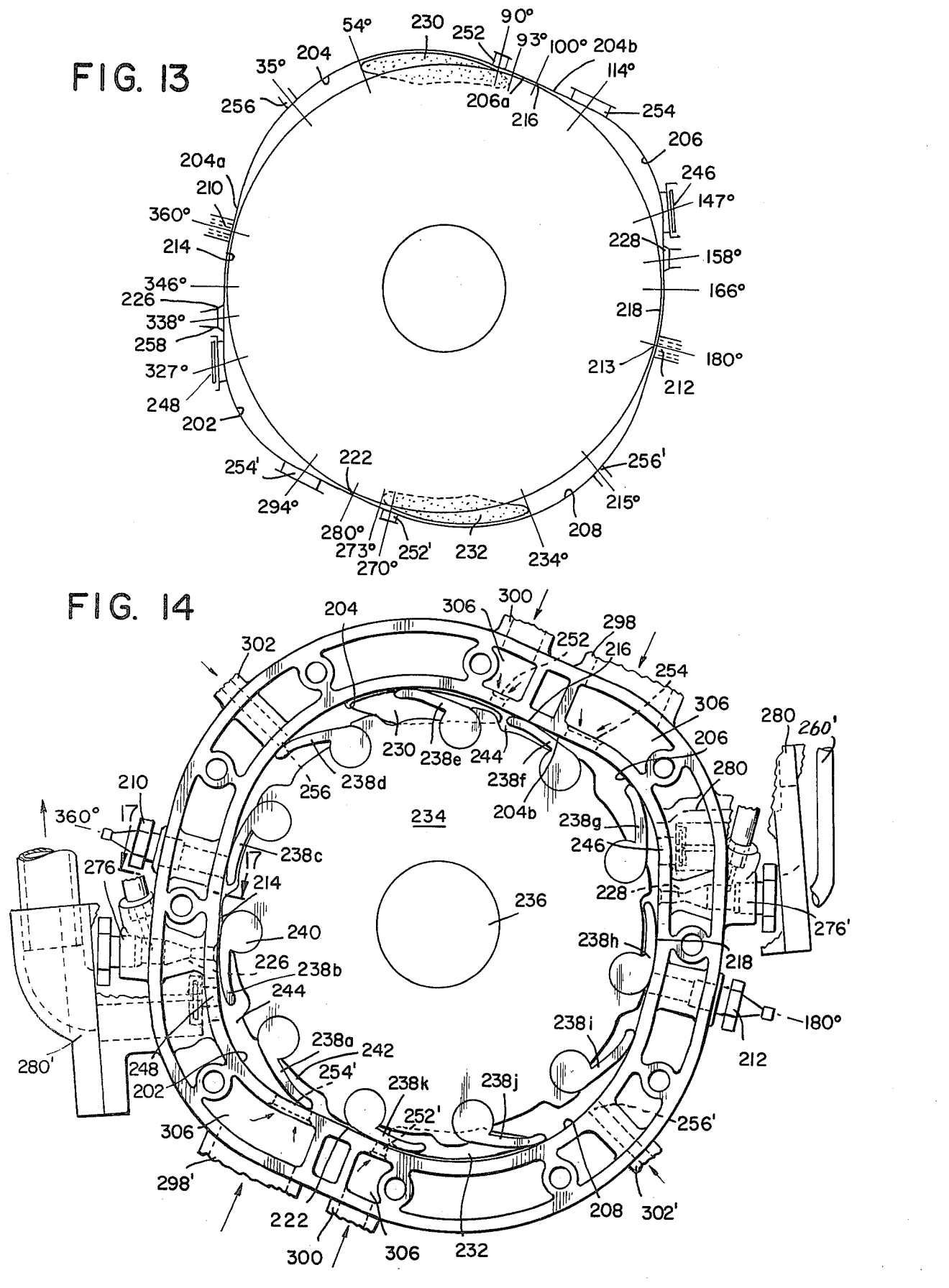

The engine shown in FIG. 12 has a central cylindrical section 200 closed off by two end sections in a manner similar to that described in the previous embodiment. The central cylindrical section 200 constitutes the engine stator having an inner surface in the form of a circle formed with four lobes or vaults. The stator inner wall is shown in FIG. 13 with two vaulted bays 202 and 204 located in one half segment thereof, and two opposed vaulted bays 206 and 208 located in the other half segment thereof. The vaulted bays 202 and 206 constitute identical intake compression bays for the travelling respiring chambers, while the vaulted bays 204 and 208 constitute identical combustion expansion bays.

The stator shown in FIG. 13 has two ignition stations which are diametrically opposed. The ignition station 210 is shown as located at 360° on a clockwise graduation of angularity from the rotor center, and the ignition station 212 is shown at 180° thereon. The ignition station 210 is associated with the preceding intake compression bay 202 which is vaulted off the basic rotor radius for a span of 66° and is followed by an arcuate abutment 214 having a length of 14° and terminating at the ignition station 210. The abutment 214 is followed by the combustion expansion bay 204 extending from the ignition station 210 to a point 216 located at 100°. The semicircle defined by these three stator wall sections ends at the point 216 in a linear abutment of no angular length before the first vault of the succeeding cycle.

Associated with the ignition station 212 is the preceding intake compression bay 206 which begins at the point 216 and extends for 66° to an arcuate abutment 218 of 14° length terminating at the ignition station 212, from which follows the combustion expansion bay 208 for a length of 100°, terminating at a linear abutment point 222 which also constitutes the start of the intake combustion bay 202 of the next chamber.

The intake compression bays and the combustion expansion bays are each of varying clearance from the rotor circle such that each bay commences at an abutment with a minimum radial distance from the center of the rotor and increases to a point at the center of the bay which is of maximum radial distance from the center of the rotor. The bay then terminates in another abutment again with a minimum radial distance from the center of the rotor.

A fuel inlet port 226 communicates with the compression bay upstream of the ignition station 210 at one side of the stator, and at the opposite side a fuel inlet port 228 communicates with the compression bay upstream of the ignition station 212. At the downstream end portion of each combustion and expansion bay, respective gas outlet ports 230 and 232 are located, these being elongated end exhausts of the type previously described, rather than radial exhausts.

As shown in FIG. 14, within the stator central cylindrical section 200 an engine rotor 234 is rotatably mounted by a central shaft 236. The motor 234 is again of circular configuration and pivotally mounted thereon are eleven vanes 238 of a type similar to the vanes 34 previously described. Each vane 238 has an enlarged end 240 of circular cross-section which is journalled in a circular socket or recess in the rotor 234. Each vane 238 overlies a trough 242 formed in the rotor 234, the troughs 242 permitting the vanes to retract into the rotor as the vanes pass along the abutment areas. A travelling respiring chamber 244 is formed between each adjacent pair of vanes 238.

The vane tip is formed with an angular corner 239 (FIG. 16) at its outer side, and a rounded corner 241 at its inner side. The angular corner 239 increases contact of the hot vane with the cooled vault walls while the rounded corner 241 reduces absorption of heat from the combustion atmosphere.

Referring to FIG. 13, the profile of the combustion expansion bay 204 is laid out by locating on the 360° ray a point of small clearance outside the circular outer surface of the rotor to be the downstream end of the arcuate ignition abutment 214, and a straight tangent 204a is drawn in a clockwise direction downstream therefrom. On the 100° ray, a point of larger clearance outside the basic rotor circle locates the linear exhaust abutment 216 which has no angular span, and a straight line through the point 216 defines two tangents 206a and 204b respectively arriving and departing from this point. The angle between the 360° ray and the 100° ray is now bisected by a ray upon which the arc of the expansion bay 204 may center, and upon this ray is marked the apex of the arc at a point selected for the rise from the basic rotor radius, and an arc is drawn through this point from the two straight abutment tangents. Thus found, the center for the arc is off the bisecting ray a small distance imposed by the differing abutment clearances. The actual apex of the arc shifts accordingly, and it occurs on a ray passing through the arc center from the center of the rotor. The profile of the combustion expansion bay 208 is constructed in an identical manner.

To design the profile of the intake compression bay 206, the arc of the ignition abutment 218 is drawn counterclockwise from the point of small clearance 213 which locates the upstream end of the combustion expansion bay 208 on the 180° ray, the abutment arc 218 extending from the point 213 counterclockwise for a span of 14°, and having a radius from the rotor center of a length to provide rotor clearance. The upstream end of the arcuate abutment 218 is thus at 166° and a straight tangent is drawn upstream from it. The span of the compression vault was chosen to be 66° for reasons to be presently explained, and thus the point locating its upstream end is on a 100° ray and coincides with abutment 216, and the straight tangent 206a is its upstream leg. The angle between the 100° and the 166° rays is then bisected by a radius at 133°, upon which the apex of the vault is located at the same maximum rise above the rotor as previously selected to be standard for all bays. This rise is marked by a point on the 133° ray, and an arc is drawn passing through this point and to the two straight tangents of abutments 216 and 218. Again, the differing abutment clearances for this vault impose a shift of its arc center a small distance away from the 133° ray, and the apex of the vault shifts accordingly, falling on the ray passing through the arc center from the center of the rotor. The profile of the intake compression bay 202 is constructed in an identical manner.

As the rotor 234 rotates within the stator, the vanes 238 turn about their journal ends while their outer bodies press outward and are returned to retracted positions as determined by their sliding engagement with the shallow vaults and abutments of the stator internal periphery. This continuous extension and retraction of the vanes provides for each travelling chamber 244 between adjacent vanes a respiration function in which fuel and air is drawn into the chamber before ignition, and the combustion gases are expelled from the chamber after ignition. Thus, it will be apparent in FIG. 14 that as a chamber 244 approaches the intake compression bay 202, for example, its volume is small while it is still exhausting combustion gases through outlet ports 232. At the upstream end of the intake compression bay, the vanes 238, defining the chamber 244 engage the abutment 222 and thus reduce the chamber 244 to minimum size. As the chamber 244 travels to the center of the intake compression bay 202, the vanes 238 pivot outwardly in their approach to the apex of the arcuate vault of the bay 202 and increase the volume of the chamber 244 to its maximum extent, during which air is drawn into the chamber, as will be presently described. Thereafter, while the chamber is still of large volume, fuel is introduced therein through the fuel inlet duct 226.

As the chamber 244 approaches the end of the intake compression bay 202, the vanes 238 encounter the abutment 214 and are retracted thereby to reduce the volume of the chamber 244 and compress the combustible mixture therein. When the chamber reaches the ignition station 210, its volume has been reduced to a minimum size, as shown in FIG. 14, and the combustible mixture therein is highly compressed for ignition by the hot plug at the ignition station 210.

At the ignition station 210 at 360°, the chamber 244 leaves the intake compression bay 202 and enters the combustion expansion bay 204, and as it travels toward the center of the latter, the vanes 238 approach the apex of the arcuate vault of the expansion bay 204 to enlarge the volume of the chamber and permit the ignited gases to expand. The leading vane 238 of the chamber 244 extends outwardly to receive the thrust of the expanding gases and provide torque force to the rotor.

As the chamber 244 travels through the downstream half of the combustion expansion bay 204, the vanes are gradually retracted and the chamber consequently reduced in volume. During this part of the travel, the chamber 244 passes the gas outlet ports 230 and the combustion gases are exhausted therethrough by the diminishing chamber. At the end of the combustion expansion bay 204, the vanes engage the tangent 204b at the abutment 216 and are retracted thereby to decrease the chamber volume to minimum size as the chamber enters the succeeding intake compression bay 206.

As previously indicated, each intake compression bay 202 and 206 has a span of 66°, while each combustion expansion bay has a span of 100°, so that the latter vaulted bays provide in each passing chamber a volume maximum approximately 25% greater than that provided in the same chambers travelling through the intake compression bays 202 and 206 of 66° span. It is a desirable feature of the engine that the volume of the chambers, at their maximum volume capacity, while traversing the expansion bays, be 25% greater than the maximum volume in transit through the intake compression bays, so that the ignited combustion gases may be gainfully expanded to a pressure more nearly that of the outside atmosphere. This is in contrast to the exhaust condition of conventional engines in which the compression/expansion volume ratio is locked at 1:1.

The design of the intake compression bays and combustion expansion bays also provides that outward pivoting of the vanes in all bays are identical at maximum loft, thus establishing a common need for a specific throat width where the vane root rises through the vane bearing from its journal. In addition, maximum bay loft determines the degree of positive and negative radial acceleration forces for a given velocity in a given span of arc, and the widening of the arc in the combustion expansion bays attenuates these acceleration forces where, on its downstream slope, the unrelieved vane pressure from negative radial acceleration on the vault wall is expected to be larger than elsewhere in the engine. Further, identical rise for all vault apices is desirable to secure for the curved contour near the vane tips, a good seat on the vault wall with a broad bearing when the vane is most extended.

The 14° span for the arcuate abutments 214 and 218 preceding the ignition stations is determined to provide volumetric efficiency in compressing the combustible charge, as well as to provide for leverage of the centrifugal mass of each vane over its heel portion to resist the pressure of initial combustion expansion in the preceding, downstream chamber.

A small clearance of the rotor for the arcuate ignition abutments 214 and 218 is also provided for the reasons just described. However, a larger clearance at the exhaust abutments 216 and 222 is provided to relieve the heavy bearing posture of the vanes inherent in their transit past any abutment, since the strong sliding seal on the chamber wall achieved at the ignition abutments is not required at the exhaust abutments 216 and 222.

An optional feature of the engine of this invention is an air staging system which is shown, by way of example, in the eleven vane engine of FIGS. 12-17. In this air staging system air is drawn off from the compression bays, cooled, and applied to an injector for pressurized entrainment and delivery of ambient air at seven psig or more, sufficient in flow quality for supercharging the main intakes to the compression bays, and for injection upstream therefrom through preliminary intake ports for cooling as well as combustion purposes. This pressurized air is also delivered to the combustion expansion bays through additive injection ports for cooling and secondary combustion, if desired.

Optionally, a hot fuel injection system precedes each of the ignition stations, in which fuel is injected from a hot nozzle by air bled from the compression bay under action of the travelling chambers.

Figure 15:
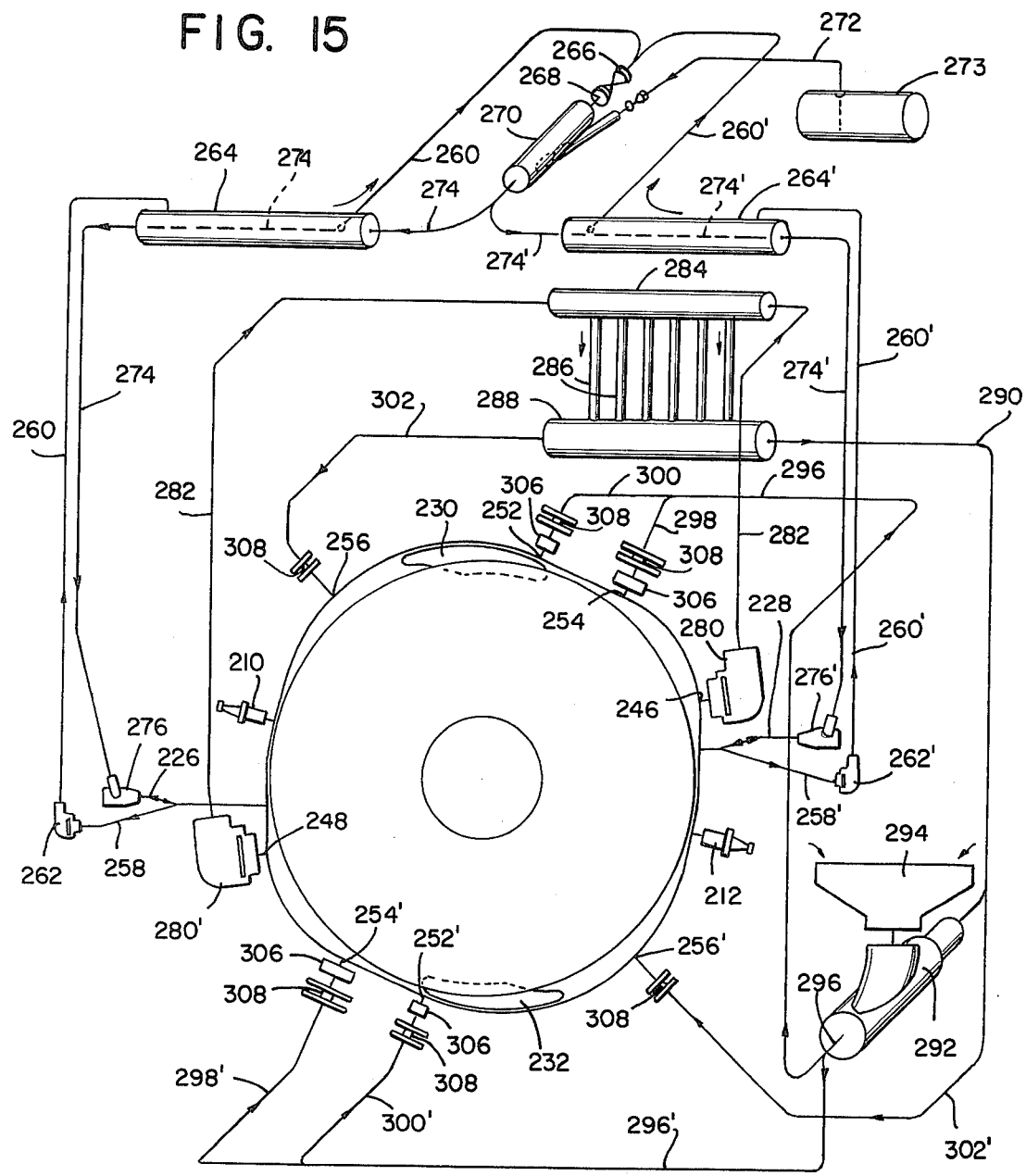
FIG. 15 is a schematic view showing the engine of FIG. 12 in association with the air staging system and fuel injection system thereof.
Figure 17:
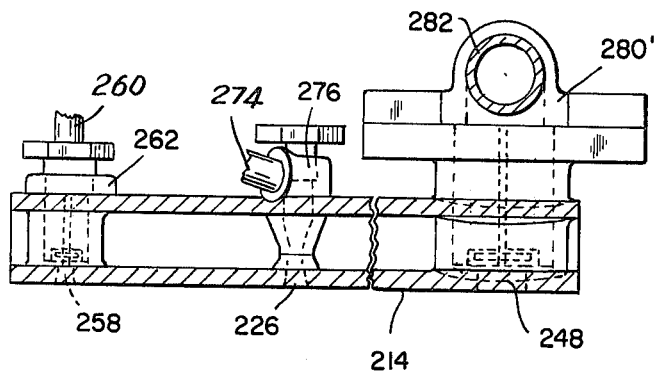
FIG. 17 is an enlarged section taken along line 17—17 of FIG. 14.

In FIGS. 14 and 15 preliminary air inlet ports 252 and 252' are shown at 90° and 270° respectively, upstream 10° from the respective exhaust abutments 216 and 222. Main combustion air inlet ports 254 and 254' are located at 114° and 294° respectively at the upstream end portions of the respective vaults 206 and 202. Additive inlet ports 256 and 256' may be located at 35° and 215° respectively, and constitute optional stations through which air may be supplied for secondary combustion or for cooling of the rotor parts. Alternatively, water may be introduced through the inlet ports 256, 256' for quenching of the high temperature resulting from combustion and in flashing to steam to increase compression and torque for a brief stroke before exhaust.

The fuel injection system includes, at one side of the engine, an air outlet port 258 located at 338° which serves to supply air for operation of the fuel injection system. Also located at 338°, but spaced transversely along the depth of the stator 200 from the air outlet port 258 is the fuel inlet port 226. As shown schematically in FIG. 15, the air outlet port 258 is connected through an accumulator valve 262, in the nature of a flutter valve, through a conduit 260 and a heater 264 to the throttle valve 266 of the engine, and thence through conduit 268 to a fuel injector 270 which communicates with the outlet pipe 272 of the liquid fuel reservoir 273 (FIG. 15). A conduit 274 connects the injector 270 to a hot fuel injector nozzle 276 communicating with the fuel inlet port 226. The conduit 274, in leading from the injector 270 to the hot fuel injection nozzle 276, passes back through the interior of the heater 264 so as to heat the fuel mixture and insure that the fuel fed to the nozzle 276 is maintained in a gaseous state.

At the other side of the engine stator, the fuel injection system includes air outlet port 258' located at 158°, and fuel inlet port 228 also located at 158° and spaced transversely from the air outlet port 258'. The air outlet port 258' is connected through accumulator valve 262' through conduit 260' and heater 264' to the throttle valve 266 and through conduit 268 to the fuel injector 270. Conduit 274 then connects the injector 270 to conduit 274' which returns through the heater 264' to a hot fuel injection nozzle 276' communicating with the fuel inlet port 228.

As each respiring chamber 244 encounters a fuel inlet port 226 or 228, it is initially of relatively large volume so as to receive a charge of gaseous fuel from the hot nozzle 276 or 276'. FIG. 14 shows the condition of the chamber 244 formed between vanes 238a and 238b just before the fuel inlet port 226 is uncovered by the leading vane 238b. Immediately thereafter, the fuel inlet port 226 is uncovered and the hot nozzle 276 delivers a charge of fuel injected by air from the high pressure bleed of the compression bay vault 202 and retained by the accumulator valve 262. The injection air is also provided by the chamber 244 between the vanes 238g and 238h at the opposite side of the engine, which is in the course of being compressed and is about to bleed air through the air outlet port 258' and accumulator valve 262' to the fuel injector 270.

The air surges received by the bleeds from the compression bays 202 and 206, by their rapid repetitions, are averaged in pressure before the throttle valve 266 which modulates the flow in the throat of injector 270. The injection duty is quite light, pressure accumulated before the throttle valve being high and pressure accumulated locally in the pipes 274, 274' with ingested fuel for the hot nozzles 276, 276', averages and is quite low comparatively. The usual large investment for pumping, throttling and timing devices required for diesel engines does not exist here, the controlled fluid being gas instead of liquid, the throttled flow is comparatively large and of low pressure, and timing is precise as a reflexive response by a pressure surge to a pressure void in a passing chamber, which reflex starts and stops the flow in each injection while it gauges the size of the charge.

As the chambers move past the fuel inlet ports 226, 228, their vanes engage the respective arcuate abutments 214, 218 and are reduced in loft. Referring to FIG. 14, as the chamber 244 between the vanes 238a and 238b travels toward the position of the preceding chamber between vanes 238b and 238c, it is reduced in volume as shown and forces air into the hot nozzle 276 as well as through the air outlet port 258. Having mixed with the tangentially injected fuel and air from the fuel injector 270, the compressed charge swiftly reverses itself and enters the following chamber between vanes 238a and 238b as the leading vane 238b moves to unblock the hot nozzle 276. The charge remains as a fuel-rich zone forward and central within the chamber between vanes 238a and 238b until compressed as the ignition station 210 is reached, where it remains axially centered and excluded from the thin upstream reaches of the trough volume at first ignition.

This centrally located fuel rich zone provides a diesel effect, achieving an over-rich central core at ignition, surrounded by comparatively lean atmospheres, a merit of the diesel cycle which reduces top combustion temperatures several hundred degrees. After first ignition, at comparatively low temperature and pressure in the fuel-rich core, combustion is completed by migration of the core outward in temperatures low enough to avoid generation of oxides of nitrogen.

FIG. 15 shows schematically the air staging system of the eleven vane engine, details of which are shown in FIG. 12. In FIG. 15 the air outlet ports 246 and 246', on opposite sides of the engine, are shown connected through respective air accumulator valves 280 and 280' and conduits 282 and 282' to an upper header 284. This upper header 284 is connected to a lower header 288 by a plurality of cooling pipes 286 which are externally cooled by a blast of atmospheric air which may be supplied by a fan (not shown). One end of the lower header 288 is connected by a conduit 290 to an air injector 292 with which communicates an air intake filter 294 exposed to the atmosphere exteriorly of the engine. The compressed air is delivered from the injector 292 through a conduit 296 having a first branch 298 connected to and feeding the main combustion air inlet ports 254 and a second branch 300 connected to and feeding the preliminary air inlet ports 252. If the optional inlet port 256 is provided for auxiliary air, a conduit 302 connects the lower header 288 directly to this auxiliary inlet port 256. For supplying air to the opposite side of the engine, a conduit 296' connects the injector 292 to the main combustion air inlet ports 254' and to the preliminary air inlet ports 252' through respective branches 298' and 300', and a conduit 302' may optionally be provided to connect the lower header 288 directly to the auxiliary inlet port 256' through conduit 290.

As shown in FIGS. 14 and 15, plenum spaces 306 enlarge the presence of air before the main air inlet ports 254, 254' and before the preliminary air inlet ports 252, 252' whereby at each of those stations a body of air lies distributed axially across the engine with short paths for entry upon brief demands from passing chambers. In each air inlet pipe connection 298, 298' and 300, 300', and in optional air inlet pipes 302, 302', an orifice 308 may be provided, as shown in FIG. 15, thus to apportion flow to each service and to sustain the proportions throughout a range of engine speed variations. The selection of orifice sizes will influence the proportion of air which is recycled from the intake compression bays in the air staging appurtenance of the engine. The use of over-sized ducts, to meter flow by orifice loss rather that by duct friction loss, also secures for the cooled zones a small refrigerating effect of adiabatic expansion in the air supply.

Beyond the cooling effect of air which is applied strategically to temper hot parts of the engine and is then wasted to atmosphere, it will be understood that the recycling of air from each intake compression bay through an external cooler provides in the recycled fluid body itself a heat sink for the absorption of temperature from the rotor and vanes during that body's presence, from the intake ports 254, 254' to the staging accumulator valve outlet ports 246, 248. Further, that portion of the investment in recycling and cooling air which is wasted to atmosphere is applied where the temperature gradient to the cooled parts is most extreme and a small amount of coolant is most effective, contributing to a total of possibly 200° F temperature reduction in the average heat concentrated in this small engine of large power. Importantly, the air-cooling adjuncts are distributed widely about the periphery of the engine, increasing the dwell of time for cooling. Finally, power capability of the engine is increased perhaps 20% by supercharging, with little power investment for recycling, in the benefaction of intercooling, so that, considering all mechanical and thermal losses in the engine, its efficiency is somewhat improved.

The sequence of operation of the eleven vane engine will be apparent in following the progress of one of the respiring chambers through a complete operating cycle achieved as the chamber travels through the intake compression bay and the combustion expansion bay at one semicircular portion of the stator. Referring to FIG. 14, the chamber 244 between the vanes 238e and 238f is shown at a location in which it is approaching the end of the combustion expansion bay. In this position of the chamber, air is flowing directly through the chamber from the preliminary air inlet ports 252 to the gas exhaust ports 230, one of which is shown in the far end plate of the stator and another of which exists in the near end plate. This flow of air cools the rotor and vanes in its path and purges remnants of spent combustible gas from the chamber before the intake compression stage commences. In its rotation, the chamber 244 is diminishing in volume as the bay vault declines to the stator abutment 216 at 100°, and in the next 6° of travel will be at a minimum volume at this abutment station. The trailing vane 238e will then obstruct and seal off the gas exhaust port 230 against loss of combustion air. As the travel of the chamber 244 continues, air is supplied through the preliminary air inlet ports 252 to fill the vacuum which might otherwise coact with the inertial force of positive radial acceleration on the vane, to spoil the peripheral seal of the leading vane 238f as it rises from the abutment 216.

As the chamber travels further, the leading vane 238f leaves the linear abutment 216 and encounters the rise of the arcuate vault 206 constituting the intake compression bay. The chamber 244 thus begins to increase in volume. The trailing vane 238e covers the preliminary air intake ports 252, at the same time in which the leading vane 238f uncovers the main air inlet ports 254 into communication with the chamber 244. A flow of air thus enters the chamber through the main air inlet ports, supplied by the air staging system, for a supercharge into the chamber as the latter increases in volume. The chamber thereafter increases in volume until the leading vane reaches the apex of the vault 206. This position is shown in FIG. 14 by the chamber between vanes 238f and 238g, the chamber having approximately the maximum volume which it may acquire in transit of the intake compression bay, while the tip of its leading vane 238g seals near the apex of the bay vault 206. Conveniently, this maximum volume of the chamber 244 persists as substantially constant for a further rotation of about 16°, or until the chamber reaches a position with relation to the bay wall in which the trailing vane 238f is about to close off the main air inlet ports 254. In FIG. 14 this position of the chamber is shown occupied, at the other half of the stator circumference, by the chamber between vanes 238a and 238b. Interaction of vanes and the stator wall during this stage of the chamber travel holds constant the capacity of the chamber over a stroke sufficiently long to permit the differential pressures, between the void and the air source, to nearly equalize, so that the engine may operate at very high speeds with good volumetric efficiency.

It will be appreciated that in such a chamber formed by inclined vanes and passing through such a bay, a volume near the maximum for the chamber is acquired when the seal of the leading vane is most remote from the trailing vane, and this relationship occurs where the leading vane tip is at maximum loft for its major grasp of upstream volume, while the trailing vane is near its minimum loft and excluding little of the volume in its sector of the bay. Subsequently, the volume of the chamber remains rather constant, until the lofts of the vanes are equal, during a stroke in which the rate of rise for the trailing vane is essentially synchonous with the rate of decline for the leading vane. Thereafter, the chamber volume decreases as the leading vane loses loft rapidly on the decline to the vault abutment, while the rate of rise for the trailing vane is reduced by its path on the less inclined approach to the vault apex.

During the course of movement of the chamber 244, the leading vane uncovers and exposes the air staging outlet port 246, and, since at this point the chamber is being reduced in volume, its further travel and reduction in volume forces some of its contained air at compressed density through the flutter check valve of the accumulator valve 280 into the staged-air system, in which it is cooled and ingests more air for supercharging the preliminary air inlet ports 252 and the main air inlet ports 254, supplying combustion and cooling air to the subsequent chambers traversing these ports. In flowing through the staged air system, this expelled air passes through the cooling pipes 286 and through the air injector 292, into which additional atmospheric air is sucked by aspiration.

Shortly after the air outlet port 246 is completely uncovered by the leading vane, the leading vane encounters and uncovers the fuel inlet port 228 and its associated air outlet port 258'. This chamber position is shown in FIG. 14 by the chamber between vanes 238g and 238h. Since the chamber at this stage is rapidly decreasing in volume, compressed air is presently to be forced through the air outlet port 258' of the fuel system, as well as through the air outlet port 246 of the staged-air system, and air will reverse flow to enter the fuel inlet port 228 briefly. When a leading vane has thus reversed flow and concentrated pressure in the hot nozzle 276', it passes to uncover the port 228 and a jet of fuel gas is supplied to the following chamber through the hot nozzle 276' and the fuel inlet port 228. Interaction of the vanes and the stator wall imposes on the chamber the maximum compression density, and the trailing vane closes off the fuel inlet port 228 and its associated air outlet port 258' when the chamber is first exposed to the hot plug 212 for ignition, while volume of the chamber is at its minimum and gas density is at maximum. This initial firing condition of the chamber is shown in FIG. 14 by the chamber between vanes 238b and 238c, which has just arrived at the hot plug 210.

The compressed fuel charge in the travelling chamber is thus ignited by the hot plug 212, and as the chamber continues its movement, the leading vane leaves the ignition abutment area 218 and enters the combustion expansion bay formed by vault 208. The leading vane thus begins its rise from its depressed position, and presents a lofted and leading chamber surface to receive the thrust of the expanding ignited fuel gas for providing a torque stroke to the rotor. In FIG. 14, the chamber between the vanes 238h and 238i shows the chamber condition at the end of the fuel ignition stage, as the trailing vane 238h is covering the hot plug 212 and the leading vane 238i is moving outward to its inclined extended position and receiving the ignition thrust.

When the tip of the leading vane arrives through the combustion expansion bay at the apex of vault 208, the interaction of both vanes with the stator wall is such as to provide approximately maximum volume for the chamber which is sustained for a relatively long stroke thereafter, in a manner similar to that provided in the intake compression bay, previously described. When the trailing vane 238 has reached a position in which it is overlying the additive inlet port 256', (this position being illustrated where the vanes are of nearly identical loft, in FIG. 14 by the chamber between vanes 238d and 238e), its volume capacity is substantially the same as that presented in its earlier travel at the position shown by the chamber between vanes 238i and 238j, where the leading vane 238j rests at the apex of the bay, so that it is apparent that the volume of the chamber is essentially uniform over this 16° traverse of the bay. This early completion of expansion, and early delivery of torque, enables the additive inlet port 256' to be located well upstream in the bay, where expansion is already reduced for little resistance to injected flow, and where there yet remains in the bay a good stroke and a good loft for torque applied from the injected fluid, the stroke and loft remaining effective for added power until the leading vane uncovers the exhaust ports.

The two pairs of exhaust ports 230 and 232 extend 39° downstream from rays at 54° and 234° respectively. The generous size of the exhaust ports is attainable because of the availability of space in the end plates of the stator and provides for wasting the products of combustion soon after the combustion power is spent, with minimum pressure loss in their flow to atmosphere. The downstream ends of each pair of exhaust ports are formed in the stator end plates as curves tangent to rays at 93° and 273° respectively. The upstream ends of the ports are shaped as silhouettes of the inner surface of a working vane arrested with its tip tangent to the 54° ray and the 234° ray. Thus, as the leading vane of a chamber passes the 234° ray, it immediately uncovers in the exhaust port 232 an opening having nearly the full slanting height of the vane, and the downstream extent of the port is such that exhausts from two successive chambers overlap widely, thereby smoothing the pulses of flow for improvement of friction conditions in the outlet conduits.

In FIG. 14, the chamber between vanes 238i and 238j is shown in the position in which the leading vane 238j is just about to uncover the exhaust ports 232. The chamber then traverses the entire extent of the exhaust port 232, during which travel the chamber volume becomes little, the chamber pressure is wasted to outside atmosphere, and the spent gases are effectively exhausted. As the leading vane clears the exhaust ports 232, it also uncovers the preliminary air inlet ports 252' and exposes the supercharging pressure of the latter to the interior of the chamber. The air, from the air staging system, supplied through the preliminary air inlet ports 252' cools the chamber interior and the vane surfaces, and assists in discharging spent gases through the exhaust ports 232. The leading vane now passes the abutment 222 at 280°, and the chamber is minimal and then increases in volume as it enters the intake compression bay where the main air inlet ports 254' are uncovered. This constitutes the end of one operational cycle, which is now repeated in the opposite semi-circular area of the stator.

In the eleven vane engine shown, the rotor 234 is preferably made with an eight inch diameter and each of the eleven vanes 238 and 3/16 inch thick, with a 1⅜ inch radius. The engine is designed to operate at speeds above 2000 to 3000 rpm, and preferably at about 6000 rpm.

With further reference to the fuel injection system shown in FIG. 15, it will be appreciated that the respiring chambers pass the fuel inlet port 226 in rapid succession as the engine operates, and that each must receive a precise charge of fuel at the proper time. The fuel injection system is so designed as to supply fuel to each passing chamber as the chamber volume is being compressed, through the hot nozzles 276, 276', in a timed, metered, and proportioned charge, while at the same time fuel feeds in a steady and controlled flow through the conduit 268 of the fuel injection system. In this regulated feed, the rising stroke of compression in each chamber as it decreases in volume in passing the fuel inlet port, discharges air under pressure through the air outlet port 258 and in the hot fuel nozzle 276 reverses and conserves the fuel flow until it is released as a combustible charge to the next succeeding chamber which arrives at the fuel inlet port containing low pressure.

At each half of the engine, the fuel injector nozzle 276, 276' and its associated accumulator check valve 262, 262' are located at the same axial line on the circumference of the stator and are situated to receive similar and simultaneous rising and falling waves of air pressure from the succeeding strokes of the passing chambers. Such air enters the hot fuel injection nozzle 276 at the height of pressure of a passing chamber and returns into the next succeeding chamber when the latter is at a lower pressure. The air entering the accumulator check valve 262 cannot return to the chamber but is conducted to the injection nozzle 276 through the throttling valve 266 and fuel injector 270 under a differential pressure for a flow volume tending to be proportional to the frequency of compression strokes.

Since the fuel supplied through the hot injection nozzles 276, 276' is in gaseous form, continuous injection at a fueling station might be acceptable. However, the pressure pulse provided, as each respiring chamber of air passes the fueling station and is compressed at this location, interrupts the steady flow of fuel and reverses the flow intermittently insofar as the injection pressure is not then superior to the passing maximum pressure of the chamber. At this time fuel is accumulated in the internal cavity of the fuel injection nozzle 276 for higher density, and close proximity of this fuel accumulation to the chamber allows rapid passage of the accumulated fuel into the succeeding chamber as soon as its lower pressure is encountered. When fuel is accumulated in the injection nozzle 276, the nozzle body serves as a heater for the final evaporation of liquid fuel, or as a polishing heater for gaseous fuel to provide rapid combustion upon ignition.

The internal cavity within each hot injection nozzle 276, 276' is cylindrical and communicates with a mouth for tangential entry of fuel, to provide a cyclonic passage for each pulse of fuel arriving and absorbing heat from the walls of the cavity. Each exposure of a travelling chamber to the nozzle port presents a wave of pressure rising from approximately 1.5 atmospheres to perhaps 24 atmospheres, and then abruptly decreasing back to 1.5 atmospheres as the mated contour of a vane passes. Peak pressure is accompanied by the peak temperature of air compression, at perhaps 1000° F, which washes the cyclonic cavity of the injection nozzle as it enters the same to stop fuel flow to the chamber and to back up and raise the local pressure of the gas continuing to flow from the throttle valve 266. In response to bay pressure abruptly lowered at the nozzle mouth, the fuel in turn washes the hot walls of the cyclonic cavity and mingles with the hot residue of air decompressing therein, as it sweeps to the greatly reduced atmosphere of a travelling chamber. Fuel enters the passing travelling chamber until the rising pressure pulse therein reverses flow in the nozzle mouth, and the resultant fuel-rich zone in the chamber travels to ignition in a fuel-lean envelope of air, thus presenting an ideal condition for combustion at a moderate maximum temperature. This limits such temperature gradients as would waste heat and intensify engine cooling requirements, and it inhibits the production of nitrogen oxides.

The accumulator valves 262, 262' are aligned axially with their associated hot nozzles 276, 276' so that they receive pulses of pressure identical to those at the nozzles. The inflow, by passing a check disk in each accumulator valve, is restrained from reverse flow so that delivery from this non-reversible pulse flows persistently to relief through the identical but reversing pulses of the hot nozzles. Accumulated air builds to a substantially constant supply pressure before the throttling valve 266, which modulates flow of fuel input through the injector 270. Air from each accumulator valve 262 and 262' is cooled in the respective conduits 264 and 264' which are the outer pipes of a double pipe heat exchanger, in the inner pipes 274 and 274' whereof opposite flow of the fuel and air mixture is thus preheated on its way back to the hot nozzles 276 and 276'.

While preferred embodiments of the invention have been shown and described herein, it is obvious that numerous omissions, changes and additions may be made in such embodiments without departing from the spirit and scope of the invention.

What is claimed is:

1. An energy converter comprising a hollow housing having end walls enclosing a central section constituting a stator,
   said central section having a chamber therein of generally circular shape defining an inner stator wall,
   a cylindrical rotor mounted for rotation about an axis central within said chamber and having a generally circular outer surface,
   a plurality of vanes pivotally mounted at equally-spaced points about the circumference of said rotor, with each of said vanes extending from its pivotal mount in the same direction along the periphery of said rotor,
   said rotor being formed with spaced troughs underlying the respective vanes, each trough being sized to receive the overlying vane in a retracted position therein with the vane outer surface recessed within the outer surface of the rotor,
   said inner stator wall being formed with at least one arcuate vaulted bay of greater radius from the center of said rotor than the basic circular extent of said stator wall, and at least one abutment station continuous with said bay,
   said abutment station constituting a location on said stator inner wall of minimal radial distance from the rotor axis, and being positioned to depress said vanes into retracted position within said troughs as said vanes travel past said abutment station,
   said vaulted arcuate bay enabling said vanes to pivot outwardly under the centrifugal force of the rotating vanes from their retracted positions to extended angular positions with the outer vane surfaces in engagement with the surfaces of said bay, each pair of adjacent vanes forming therebetween a travelling chamber, the volume of which increases and decreases as said vanes move between their extended and retracted positions as said rotor turns within said stator, the outer surface of each vane being formed as a compound curve with each engaging area of the vane outer surface of lesser radius than the radius of the stator inner wall which it engages, whereby the vane outer surface is compatible with all surfaces of the stator inner wall, each of said vanes engaging the surface of said bay at a sealing line which migrates from the journal end portion of said vane to the tip end portion thereof during the travel of said vane along said bay, whereby to provide a constant seal at the trailing end of one travelling chamber and the leading end of the succeeding travelling chamber, said vanes providing the only seals between adjacent chambers.

2. An energy converter according to claim 1 in which said vanes are mounted to pivot outwardly under centrifugal force as said rotor rotates, the outer surface of said vanes making constant wiping contact with said inner stator wall to provide sliding seals between adjacent travelling chambers.

3. An energy converter according to claim 2 in which the stator inner wall surface is engaged by an area of each vane outer surface, said area moving closer to the pivotal mount of said vane as said vane traverses that portion of the stator inner wall in which the vaulted bay approaches said abutment station in the direction of rotor rotation, whereby at said approach the sliding seal strength is increased by leverage of centrifugal force in the vane mass overhanging said engaged vane area, and by the reduction of the surface of said vane exposed to gas compressing in the downstream chamber.

4. An energy converter according to claim 2 in which each vane engages and presses against the stator inner wall surface under centrifugal force and radial acceleration forces, with maximum positive radial acceleration forces released at that area in which said vaulted bay departs from said abutment station in the direction of rotor rotation, whereby bearing stress in the sliding seal is reduced at said departure area.

5. An energy converter according to claim 2 in which the stator inner wall surface is engaged by an area of each vane outer surface, which area moves outward from the pivotal mount of said vane as said vane traverses that portion of the stator inner wall in which said vaulted bay departs from said abutment station in the direction of rotor rotation, whereby at said departure bearing stress in the sliding seal is reduced by the reduction in leverage of centrifugal force in the vane mass overhanging said engaged vane area, and by the enlargement of the surface of said vane exposed to gas compressed in the adjacent downstream chamber.

6. An energy converter according to claim 2 in which said vanes are dragged in lagging condition from their respective journals in sliding engagement with said vaulted bay as said rotor rotates, and in which said vanes are so positioned that at least two of said vanes engage said bay at all times, and the volume of said travelling chamber is approximately maximum for said bay when the leading vane of said chamber is at maximum loft and remains approximately maximum until the trailing vane and said leading vane of said chamber are of similar loft, for a sustained dwell of maximum volume in the respiring stroke of said travelling chamber.

7. An energy converter according to claim 2 in which a migrating area of each vane outer surface engages the surface of said stator inner wall, said engaged migrating area being closest to the journal of said vane when engaged with an abutment station of said stator inner wall, at which time the metal bearing stress of sealing pressure applied by leverage of centrifugal force in the vane mass overhanging said engaged area is maximum, said leverage and said bearing stress being reduced by the provision of larger clearance between said rotor and said abutment station.

8. An energy converter according to claim 2 in which spring means are provided on each vane to vary the strength and the bearing stress of said sliding seals.

9. An energy converter according to claim 2 which also includes a forced oil circulation system for lubrication of said seals, said forced oil circulation system comprising an annular sump between each rotor end and the housing end walls, and means for circulating oil from said sump to each of the passing vanes in response to centrifugal spinning of said rotor ends, and for return of said oil to said sump in response to the arrival of the travelling chambers at stations of high pressure.

10. An energy converter according to claim 2 in which spring-tensioned sealing means are provided at the end corners of the rotor to engage the end walls of said housing and provide a sliding seal between said rotor and said housing end walls.

11. An energy converter according to claim 10 in which said spring-tensioned sealing means comprise L-shaped seals, each having a first leg recessed axially in the rotor end face and a second leg extending radially outward from said first leg and bearing on the end wall of said housing, said second leg being urged outwardly against said housing end wall by differential pressure from a travelling chamber.

12. An energy converter according to claim 2 in which each of said vanes is provided with side sealing means engaging the end walls of said housing and providing a sliding seal between said sides of said vanes and said housing end walls.

13. An energy converter according to claim 12 in which each of said vanes is segmented with tongue and groove joints between segments, and with spring means urging equal separation between the segments for expansion outwardly of the vane body into engagement with said housing end walls.

14. An energy converter according to claim 2 which includes a plurality of arcuate vaulted bays and a plurality of abutment stations with each abutment station located at a respective juncture of said bays.

15. An energy converter according to claim 14 in which each of said bays differs from one another in size and shape to accomodate differing functions for the cycling of fluids through said energy converter.

16. An energy converter according to claim 14 in which said energy converter is a rotary internal combustion engine having at least one ignition station, at least one fuel inlet station, at least one gas outlet station, at least one vaulted bay constituting a compression bay and another vaulted bay constituting a combustion expansion bay downstream of each said compression bay, each said ignition station being located adjacent the abutment area between each said compression bay and said downstream combustion expansion bay.

17. A rotary engine according to claim 16 in which said inlet station is located at the upstream end portion of said compression bay and said gas outlet station is located at the downstream end portion of said combustion expansion bay, whereby each travelling chamber increases in volume as it enters said compression bay to collect a charge of fuel mixture, decreases in volume as it leaves said compression bay to compress said fuel charge, transports said compressed fuel charge past said ignition station at said connecting abutment, increases in volume as it enters said combustion expansion bay to accept power from the combustion expansion of the ignited fuel charge upon the leading vane of said travelling chamber, and decreases in volume as it leaves the combustion expansion bay to exhaust the combusted fuel gases through said gas outlet station.

18. A rotary engine according to claim 17 in which said ignition station is a hot plug of steady temperature and in which said fuel inlet station, gas outlet station and hot plug constitute servicing stations communicating with the inner periphery of said stator and providing a steady availability of service at each said servicing station, whereby each travelling chamber itself times and meters the service it receives as its leading vane passes to expose said chamber to said servicing station and as its trailing vane passes to cut off communication between said chamber and said servicing station.

19. A rotary engine according to claim 17 which includes at least two firing stations and a plurality of vanes, and in which the number of vanes is so selected relative to the number of firing stations that no two firing stations ignite fuel at the same time, the impulses for fuel entry, combustion, torque and exhaust for one firing station are each out of phase with those impulses for each other firing station, the peak stresses for output and services are spaced and distributed to reduce the output shaft size and the size of the header connections for fluid flow, and in the engine periphery between one combustion cycle and another each impulse for noise and vibration occurs separately in time.

20. A rotary engine according to claim 17 in which the shape and size of said compression bays differs from the shape and size of said downstream combustion expansion bay, and in which said combustion expansion bay is longer and larger than said compression bay to provide a power stroke of greater extent than the compression stroke.

21. A rotary engine according to claim 17 which includes a single ignition station, a single compression bay, and a single combustion expansion bay.

22. A rotary engine according to claim 17 which includes two ignition stations diametrically opposed on said stator, a compression bay upstream of each ignition station, a combustion expansion bay downstream of each ignition station, a respective fuel inlet station communicating with each of the compression bays, and a respective gas outlet station communicating with each of said combustion expansion bays.

23. A rotary engine according to claim 17 having at least one additive port communicating with each combustion expansion bay and adapted to be fed from a source of pressurized water for supplying said pressurized water to each travelling chamber passing said additive port, whereby in flashing to steam said pressurized water cools said rotor and enhances pressure in the power stroke of said chamber.

24. A rotary engine according to claim 17 which also includes fuel injection means communicating with each compression bay for delivering a timed and metered charge of fuel to each travelling chamber successively traversing said compression bay in response to the accumulated pressure pulse received from the preceding travelling chamber as the latter is reduced in volume in said compression bay.

25. A rotary engine according to claim 24 in which a pressurized flow of fuel is timed and metered to each travelling chamber by the reversal of flow from pressure rising in said chamber and by the resumption of flow to the lesser pressure of the next succeeding chamber.

26. A rotary engine according to claim 24 in which said fuel injection means includes an accumulator check valve communicating with each compression bay for introducing compressed gas into said fuel injection means and a fuel injection nozzle located adjacent to said accumulator check valve, said fuel injection nozzle and accumulator check valve being located to receive similar and simultaneous rising and falling pressure pulses from succeeding strokes of passing travelling chambers, whereby air entering the injection nozzle at the height of a pressure pulse returns to a succeeding chamber of lower pressure, and the air entering the accumulator check valve is conducted to the injection nozzle through a throttling valve and a fuel suction injector under a differential pressure for flow proportional to the frequency of compression strokes.

27. A rotary engine according to claim 26 which also includes fuel mixture heater means communicating with said fuel injection nozzle.

28. A rotary engine according to claim 17 which also includes air staging means for receiving air under pressure from each travelling chamber as it is compressed at the downstream end portion of the compression bay, cooling said air, increasing the volume of said air by ingestion through an air injector, and transferring said enlarged volume of air to at least one air injection station in said compression bay.

29. A rotary engine according to claim 28 in which said air staging means has a main air inlet port communicating with each compression bay for supplying air under supercharging pressure to each travelling chamber passing said main air inlet port at maximum volume.

30. A rotary engine according to claim 29 in which said air staging means has an additive air inlet port communicating with said combustion expansion bay for supplying said supercharging air to each travelling chamber passing said additive air inlet port as secondary combustion air and for cooling of said rotor.

* * * * *